(12) United States Patent
Xu et al.

(10) Patent No.: US 12,375,977 B2
(45) Date of Patent: Jul. 29, 2025

(54) METHOD AND APPARATUS FOR RECONFIGURATION IN WIRELESS COMMUNICATION SYSTEM

(71) Applicant: LG ELECTRONICS INC., Seoul (KR)

(72) Inventors: Jian Xu, Seoul (KR); Jongwoo Hong, Seoul (KR); Daewook Byun, Seoul (KR); Seokjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 330 days.

(21) Appl. No.: 17/800,465

(22) PCT Filed: Mar. 26, 2021

(86) PCT No.: PCT/KR2021/003785
§ 371 (c)(1),
(2) Date: Aug. 17, 2022

(87) PCT Pub. No.: WO2021/194306
PCT Pub. Date: Sep. 30, 2021

(65) Prior Publication Data
US 2023/0099609 A1     Mar. 30, 2023

(30) Foreign Application Priority Data
Mar. 26, 2020 (KR) ................. 10-2020-0036700

(51) Int. Cl.
*H04W 36/00*     (2009.01)
(52) U.S. Cl.
CPC . *H04W 36/0033* (2013.01); *H04W 36/00698* (2023.05)
(58) Field of Classification Search
CPC .......... H04W 36/362; H04W 36/0033; H04W 36/00695; H04W 36/08; H04W 36/00837;
(Continued)

(56) References Cited

U.S. PATENT DOCUMENTS 10,575,356 B2    2/2020    Wu
2016/0219473 A1    7/2016    Teyeb et al.
(Continued)

FOREIGN PATENT DOCUMENTS

EP    3 413 625 B1    6/2018
EP    3413682 A1    12/2018

OTHER PUBLICATIONS

3rd Generation Partnership Project; Technical Specification Group Radio Access Network; NR; Radio Resource Control (RRC) protocol specification (Release 15), 3GPP TS 38.331 V15.8.0 (Dec. 2019).
(Continued)

*Primary Examiner* — Allahyar Kasraian
(74) *Attorney, Agent, or Firm* — BRYAN CAVE LEIGHTON PAISNER LLP

(57) ABSTRACT

The present disclosure relates to a reconfiguration in a wireless communication system. According to various embodiments, a method performed by a master node (MN) serving a wireless device with a source secondary node (SN) in a dual connectivity (DC) in a wireless communication system comprises: transmitting, to the wireless device, radio resource control (RRC) reconfiguration parameters; transmitting, to the source SN, a request message for a user equipment (UE) context stored in the source SN; receiving, from the source SN, a response message comprising the UE context; transmitting, to a target SN, a SN addition request message comprising the UE context; receiving, from the target SN, a SN addition request acknowledgement message comprising a delta configuration for the RRC reconfiguration parameters, wherein the delta configuration comprises a configuration that is changed with respect to the RRC reconfiguration parameters in the UE context; and transmit- (Continued)

ting, to the wireless device, a RRC reconfiguration message for SN mobility comprising the delta configuration.

11 Claims, 23 Drawing Sheets

(58) Field of Classification Search
CPC ....... H04W 36/0069; H04W 36/00698; H04W 36/0077; H04W 36/00835
See application file for complete search history.

(56) References Cited

U.S. PATENT DOCUMENTS

| | | | | |
|---|---|---|---|---|
| 2017/0134998 | A1 | 5/2017 | Xu et al. | |
| 2020/0053815 | A1 | 2/2020 | Teyeb et al. | |
| 2021/0219193 | A1* | 7/2021 | Teyeb | H04W 76/30 |
| 2022/0167233 | A1* | 5/2022 | Shi | H04W 36/0061 |
| 2022/0312283 | A1* | 9/2022 | Chen | H04W 36/0061 |
| 2022/0369412 | A1* | 11/2022 | Teyeb | H04W 74/0833 |
| 2024/0163739 | A1* | 5/2024 | Purkayastha | H04W 76/15 |
| 2024/0284274 | A1* | 8/2024 | Park | H04W 36/0061 |
| 2024/0406820 | A1* | 12/2024 | Stanczak | H04W 36/0085 |
| 2024/0414803 | A1* | 12/2024 | Cheng | H04W 24/10 |

OTHER PUBLICATIONS

Ericsson, "Introduction of on-demand SI procedure in RRC_Connected", 3GPP TSG-RAN WG2 Meeting #109-e, R2-2002396, Electronic Meeting, Feb. 24, 2020-Mar. 6, 2020.
3GPP TS 37.340 V16.0.0 (Dec. 2019), 3rd Generation Partnership Project, Technical Specification Group Radio Access Network, "Technical Specification Group Radio Access Network Multi-connectivity", Stage 2, (Release 16), © 2019, 3GPP Organizational Partners (ARIB, ATIS, CCSA, ETSI, TSDSI, TTA, TTC), (72 pages).
RP-193249, 3GPP TSG RAN Meeting #86, Sitges, Spain, Dec. 9-12, 2019, Source: Huawei, Title: New WID on further enhancements on Multi-Radio Dual-Connectivity, Document for: Approval, Agenda Item: 9.1.2, 3GPP™ Work Item Description, (5 pages).
RP-201040, (revision of RP-193249), 3GPP TSG RAN Meeting #88e, Electronic Meeting, Jun. 29-Jul. 3, 2020, Source: Huawei, Title: Revised WID on Further Multi-RAT Dual-Connectivity enhancements, Document for: Approval, Agenda Item: 9.10.9, 3GPP™ Work Item Description, (4 pages).
R2-1909398 (Aug. 16, 2019), 3GPP TSG-RAN WG2 Meeting #107, Prague, Czech Republic, Aug. 26-30, 2019, Agenda Item: 10.4.1.3.11, Source: Intel Corporation, Title: Open items related to Delta configuration with ServingCellConfigCommon, Document for: Discussion and decision (6 pages).
R2-1912261 (Oct. 3, 2019), 3GPP TSG-RAN WG2 Meeting #107bis, Chongqing, China, Oct. 14-18, 2019, Source: vivo, Agenda Item: 6.4.5, Title: Remaining issues on PC5-RRC message exchange, Document for: Discussion and Decision (7 pages).
R3-190594 (Feb. 15, 2019), 3GPP TSG-RAN WG3 Meeting #103, Athens, Greece, Feb. 25-Mar. 1, 2019, Title: Discussion on Delta RRC configuration support in gNB-CU, Source: Huawei, Agenda Item: 9.3.16, Document for: Others (4 pages).
R3-192242, (May 1, 2019), 3GPP TSG-RAN WG3 Meeting #104, Reno, NV, USA, May 13-17, 2019, Change Request 27.340 CR Draft rev—Current Version: 15.5.0, Proposed change affects: Radio Access Network, Title: CR37340 for correction on the usage of SN Reconfiguration Completion, Source to WG: ZTE, Source to TSG: R3, Work item code: NR_newRAT-Core, Date: Apr. 29, 2019, Category: F, Release: Rel-15, (24 pages).

* cited by examiner

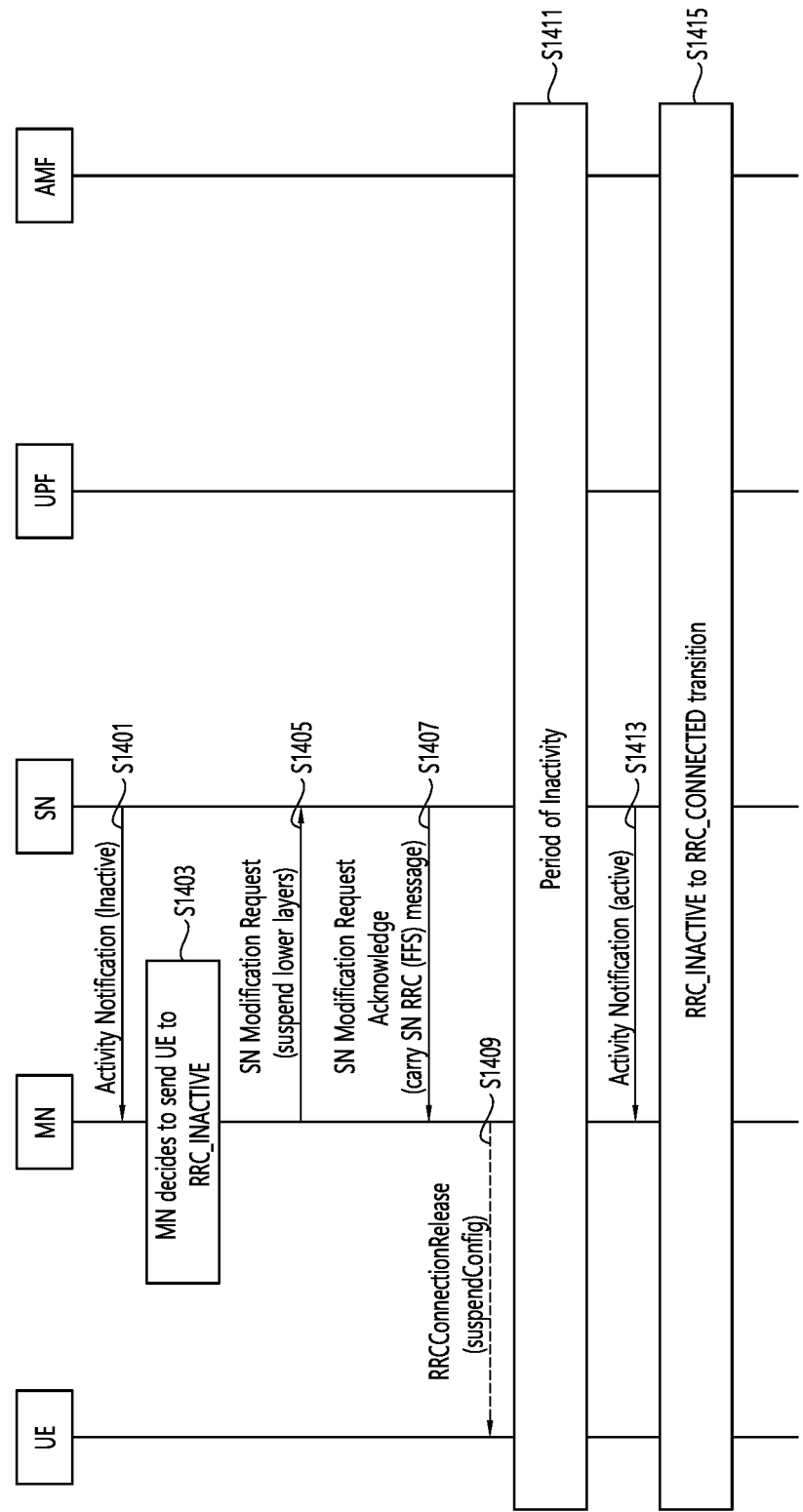

METHOD AND APPARATUS FOR RECONFIGURATION IN WIRELESS COMMUNICATION SYSTEM

CROSS-REFERENCE TO RELATED APPLICATIONS

This application is a National Stage Filing Under 25 U.S.C. 371 of International Application No. PCT/KR2021/003785, filed on Mar. 26, 2021, which claims priority to Korean Application No. 10-2020-0036700, filed on Mar. 26, 2020, the contents of which are all hereby incorporated by reference herein in their entirety.

TECHNICAL FIELD

The present disclosure relates to a reconfiguration in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In a wireless communication system (e.g., 5G NR), DC/CA enhancements may be important items for enhancing communication services. One use case may comprise how to support low layer suspend and resume in a secondary node (SN) including both aggregated and disaggregated case. The mobility scenario such as SN change has not been considered yet.

SUMMARY

1. Technical Problem

An aspect of the present disclosure is to provide method and apparatus for a reconfiguration in a wireless communication system.

Another aspect of the present disclosure is to provide method and apparatus for RRC reconfiguration for SN in inactive and/or suspend state in a wireless communication system.

Another aspect of the present disclosure is to provide method and apparatus for RRC reconfiguration for SN—distributed unit (DU) in inactive and/or suspend state in a wireless communication system.

Another aspect of the present disclosure is to provide method and apparatus for RRC reconfiguration for a target SN in a SN mobility procedure in inactive and/or suspend state in a wireless communication system.

2. Technical Solution

According to various embodiments, a method performed by a master node (MN) serving a wireless device with a source secondary node (SN) in a dual connectivity (DC) in a wireless communication system comprises: transmitting, to the wireless device, radio resource control (RRC) reconfiguration parameters; transmitting, to the source SN, a request message for a user equipment (UE) context stored in the source SN; receiving, from the source SN, a response message comprising the UE context; transmitting, to a target SN, a SN addition request message comprising the UE context; receiving, from the target SN, a SN addition request acknowledgement message comprising a delta configuration for the RRC reconfiguration parameters, wherein the delta configuration comprises a configuration that is changed with respect to the RRC reconfiguration parameters in the UE context; and transmitting, to the wireless device, a RRC reconfiguration message for SN mobility comprising the delta configuration.

According to various embodiments, a master node (MN) serving a wireless device with a source secondary node (SN) in a dual connectivity (DC) in a wireless communication system comprises: a memory; a transceiver; and at least one processor operatively coupled to the transceiver and the memory, wherein the at least one processor is configured to control the transceiver to: transmit, to the wireless device, radio resource control (RRC) reconfiguration parameters; transmit, to the source SN, a request message for a user equipment (UE) context stored in the source SN; receive, from the source SN, a response message comprising the UE context; transmit, to a target SN, a SN addition request message comprising the UE context; receive, from the target SN, a SN addition request acknowledgement message comprising a delta configuration for the RRC reconfiguration parameters, wherein the delta configuration comprises a configuration that is changed with respect to the RRC reconfiguration parameters in the UE context; and transmit, to the wireless device, a RRC reconfiguration message for SN mobility comprising the delta configuration.

According to various embodiments, a processor for a master node (MN) serving a wireless device with a source secondary node (SN) in a dual connectivity (DC) in a wireless communication system is configured to control the wireless device to perform operations comprising: transmitting, to the wireless device, radio resource control (RRC) reconfiguration parameters; transmitting, to the source SN, a request message for a user equipment (UE) context stored in the source SN; receiving, from the source SN, a response message comprising the UE context; transmitting, to a target SN, a SN addition request message comprising the UE context; receiving, from the target SN, a SN addition request acknowledgement message comprising a delta configuration for the RRC reconfiguration parameters, wherein the delta configuration comprises a configuration that is changed with respect to the RRC reconfiguration parameters in the UE context; and transmitting, to the wireless device, a RRC reconfiguration message for SN mobility comprising the delta configuration.

According to various embodiments, a computer-readable medium having recorded thereon a program for performing each step of a method on a computer is provided. The method comprises: transmitting, to the wireless device, radio resource control (RRC) reconfiguration parameters; transmitting, to the source SN, a request message for a user equipment (UE) context stored in the source SN; receiving, from the source SN, a response message comprising the UE context; transmitting, to a target SN, a SN addition request message comprising the UE context; receiving, from the target SN, a SN addition request acknowledgement message comprising a delta configuration for the RRC reconfiguration parameters, wherein the delta configuration comprises a configuration that is changed with respect to the RRC reconfiguration parameters in the UE context; and transmitting, to the wireless device, a RRC reconfiguration message for SN mobility comprising the delta configuration.

According to various embodiments, a method performed by a wireless device served by a master node (MN) and a source secondary node (SN) in a dual connectivity (DC) in a wireless communication system comprises: receiving, from the MN, radio resource control (RRC) reconfiguration parameters; receiving, from the MN, a RRC reconfiguration message for SN mobility comprising a delta configuration for the RRC reconfiguration parameters; obtaining a full RRC reconfiguration by applying the delta configuration to the RRC reconfiguration parameters; and performing the SN mobility from the source SN to the target SN based on the full RRC reconfiguration, wherein a user equipment (UE) context comprising the RRC reconfiguration parameters and stored in the source SN is transferred from the source SN to the target SN via the MN, wherein the delta configuration is determined by the target SN based on the UE context comprising the RRC reconfiguration parameters so that the delta configuration comprises a configuration that is changed with respect to the RRC reconfiguration parameters in the UE context, and wherein the delta configuration is transferred from the target SN to the MN before the wireless device receiving the RRC reconfiguration message comprising the delta configuration.

According to various embodiments, a wireless device served by a master node (MN) and a source secondary node (SN) in a dual connectivity (DC) in a wireless communication system comprises: a memory; a transceiver; and at least one processor operatively coupled to the transceiver and the memory, wherein the at least one processor is configured to: control the transceiver to receive, from the MN, radio resource control (RRC) reconfiguration parameters; control the transceiver to receive, from the MN, a RRC reconfiguration message for SN mobility comprising a delta configuration for the RRC reconfiguration parameters; obtain a full RRC reconfiguration by applying the delta configuration to the RRC reconfiguration parameters; and perform the SN mobility from the source SN to the target SN based on the full RRC reconfiguration, wherein a user equipment (UE) context comprising the RRC reconfiguration parameters and stored in the source SN is transferred from the source SN to the target SN via the MN, wherein the delta configuration is determined by the target SN based on the UE context comprising the RRC reconfiguration parameters so that the delta configuration comprises a configuration that is changed with respect to the RRC reconfiguration parameters in the UE context, and wherein the delta configuration is transferred from the target SN to the MN before the wireless device receiving the RRC reconfiguration message comprising the delta configuration.

3. Advantageous Effect

The present disclosure may have various advantageous effects.

For example, allowing a suspend/resume of ReconfigurationWithSync related parameters can further improve the performance of a UE in DC. This can save the signaling/actions of an inactive UE when the data packets come for setting up dual connectivity.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIGS. 14A and 14B show a second example of MR-DC with 5GC with RRC_INACTIVE to which technical features of the present disclosure can be applied.

DETAILED DESCRIPTION

Figure 1:
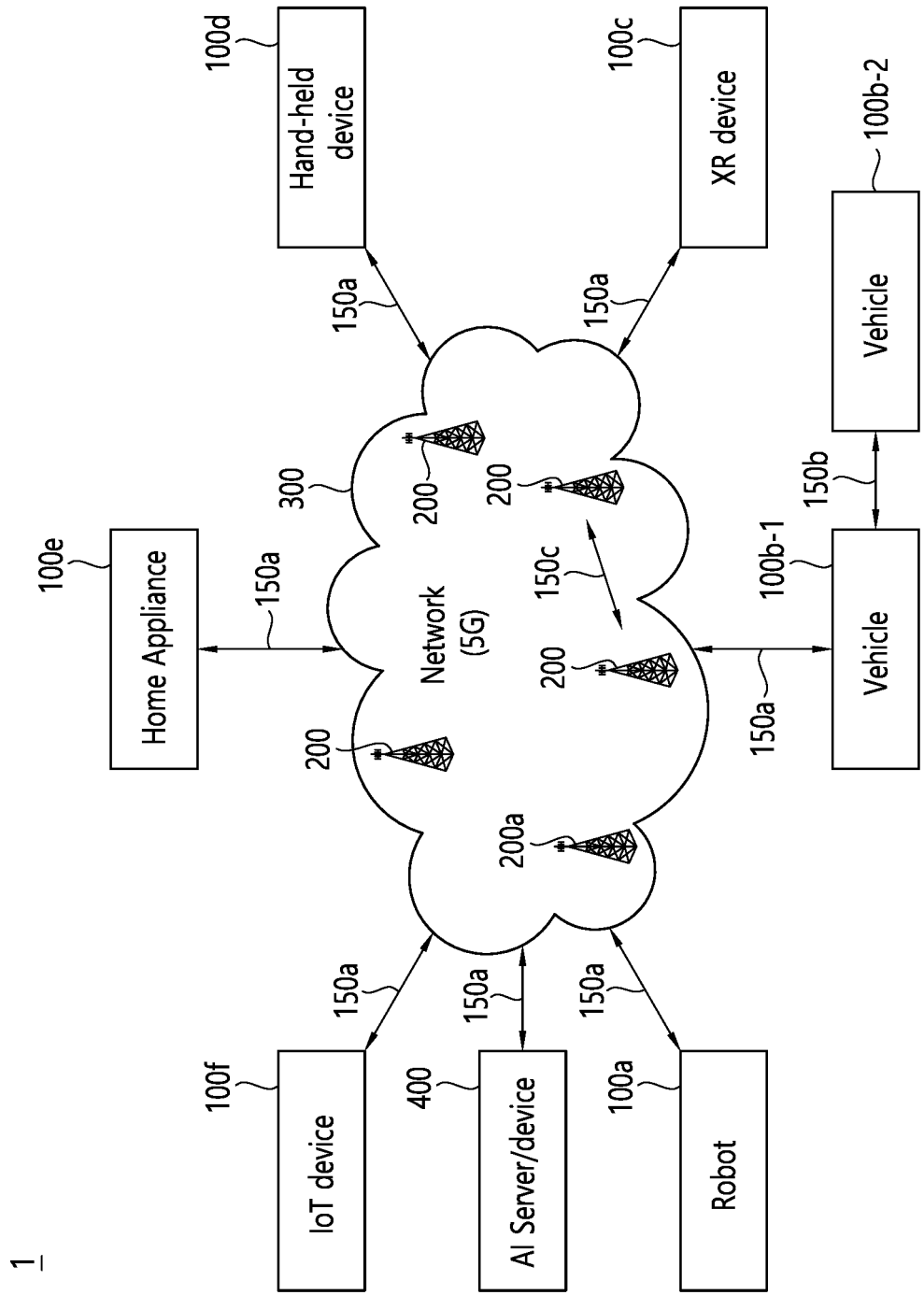
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (JAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHZ | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHZ | 60, 120, 240 kHz |

Figure 2:
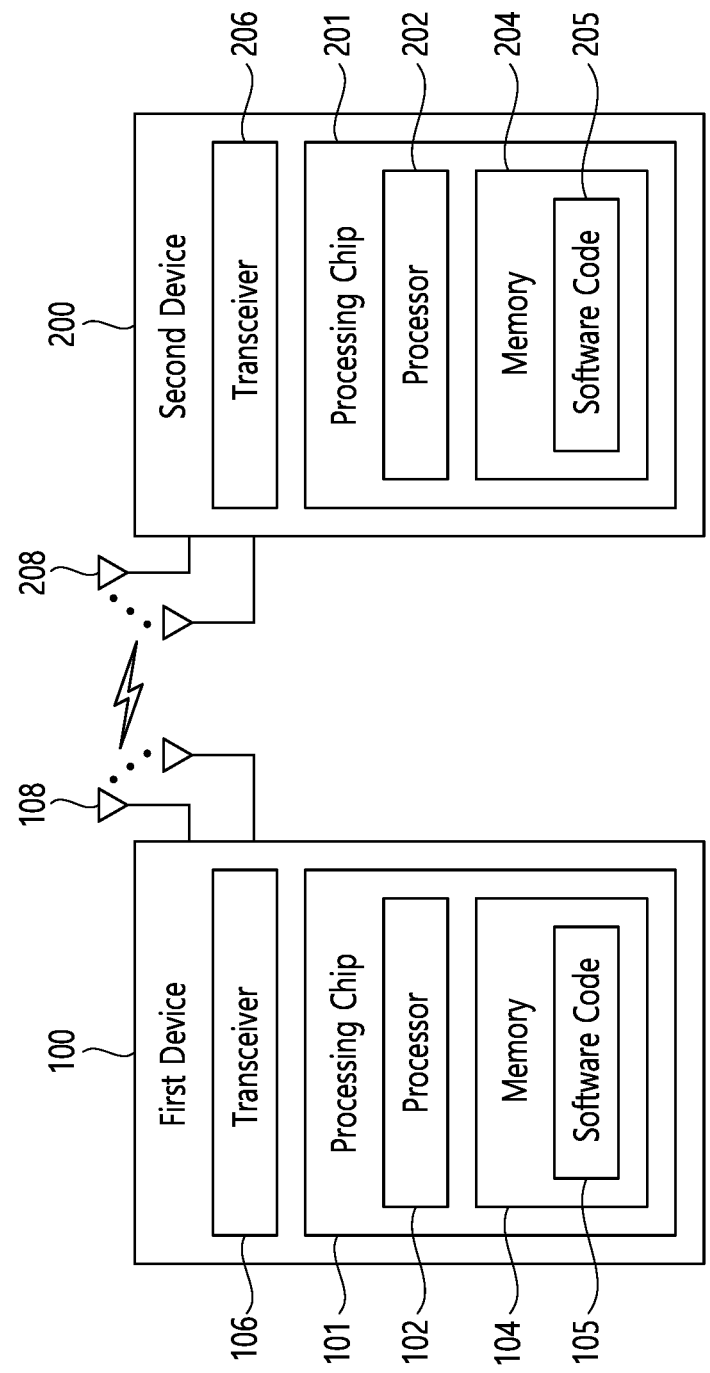
FIG. 2 shows an example of wireless devices to which implementations of the present disclosure is applied.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names. FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
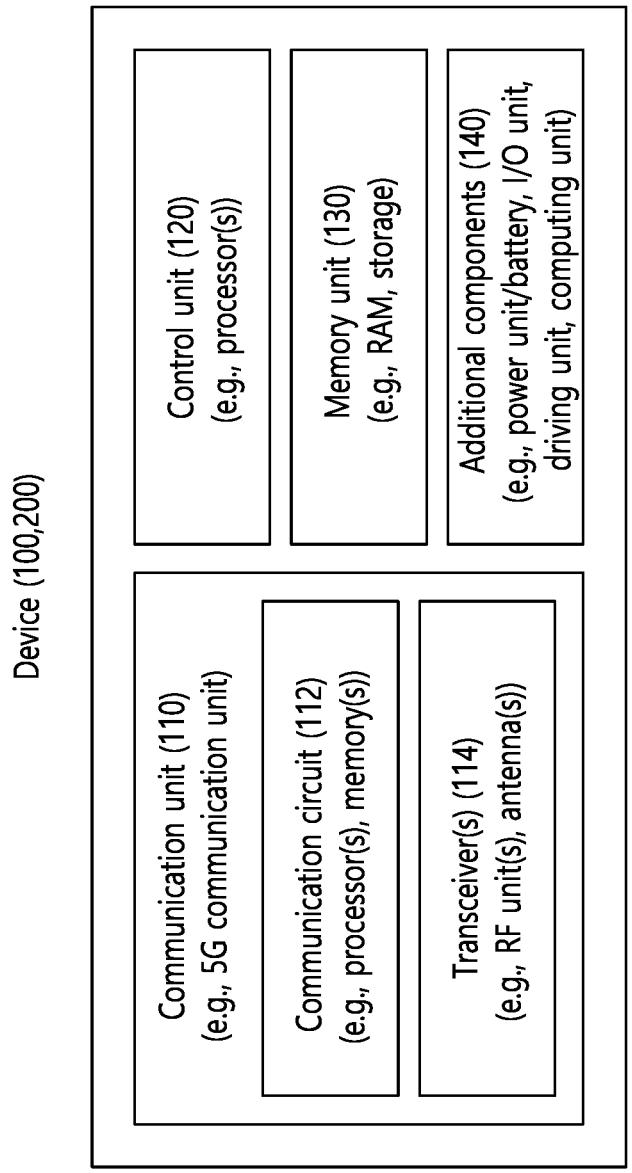
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
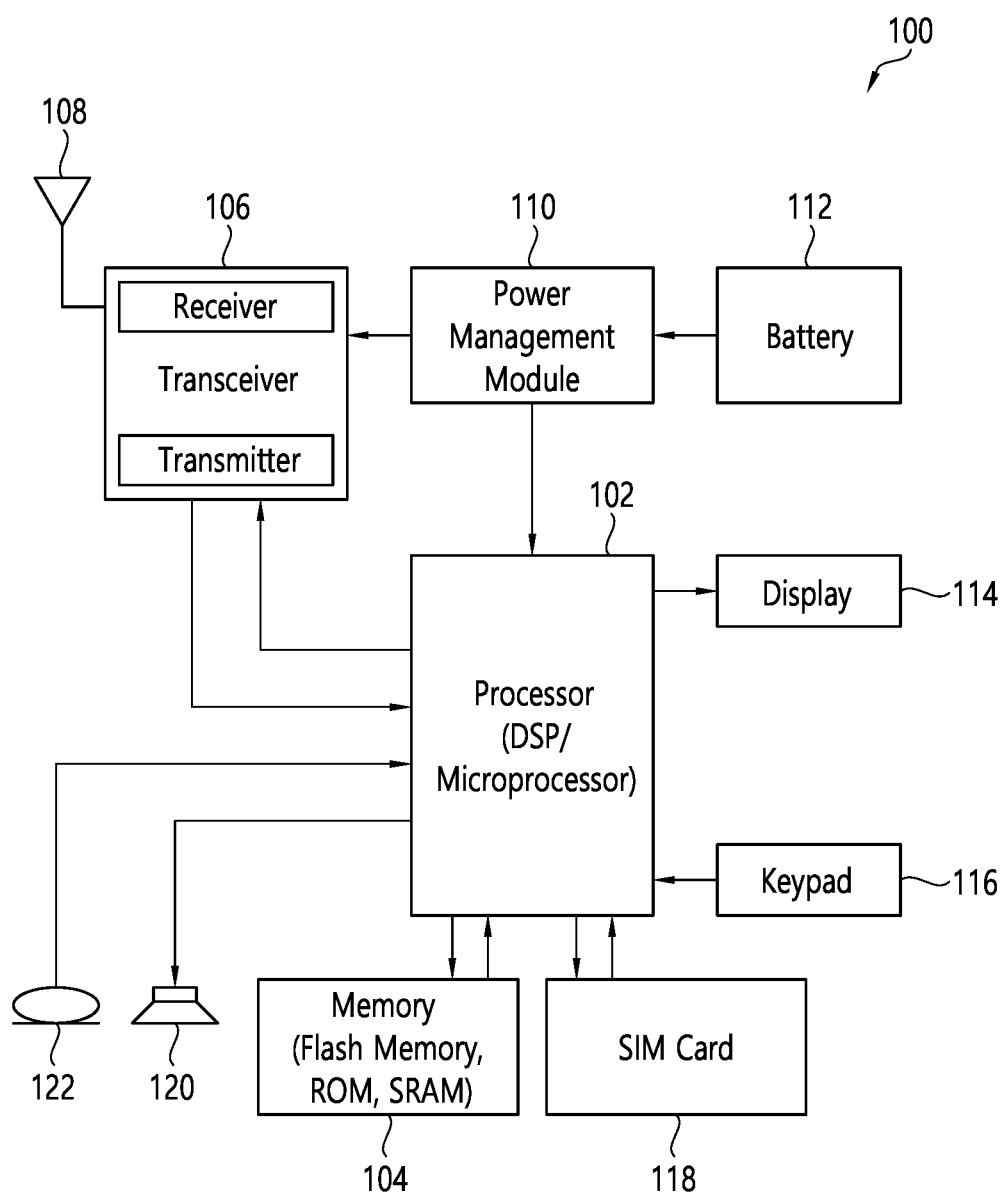
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
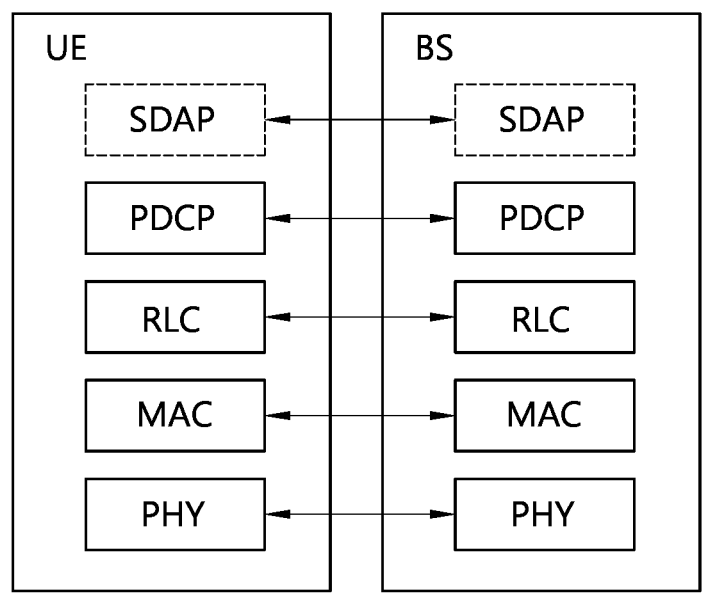
FIGS. 5 and 6 show an example of protocol stacks in a 3GPP based wireless communication system to which implementations of the present disclosure is applied.
Figure 6:
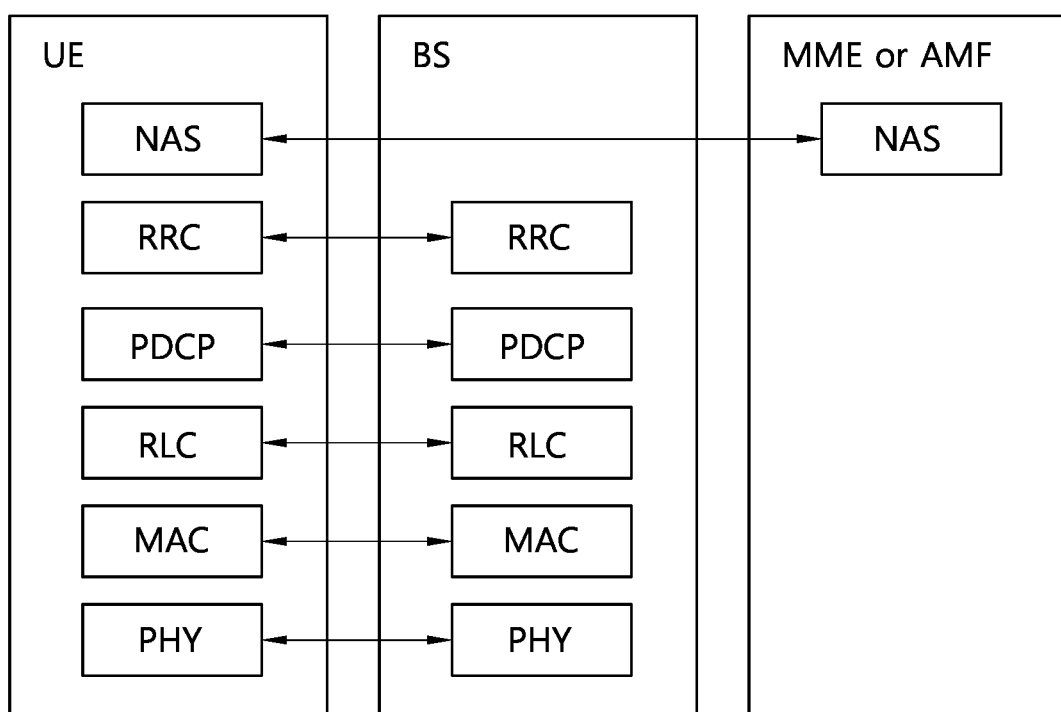

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged mode (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 7:
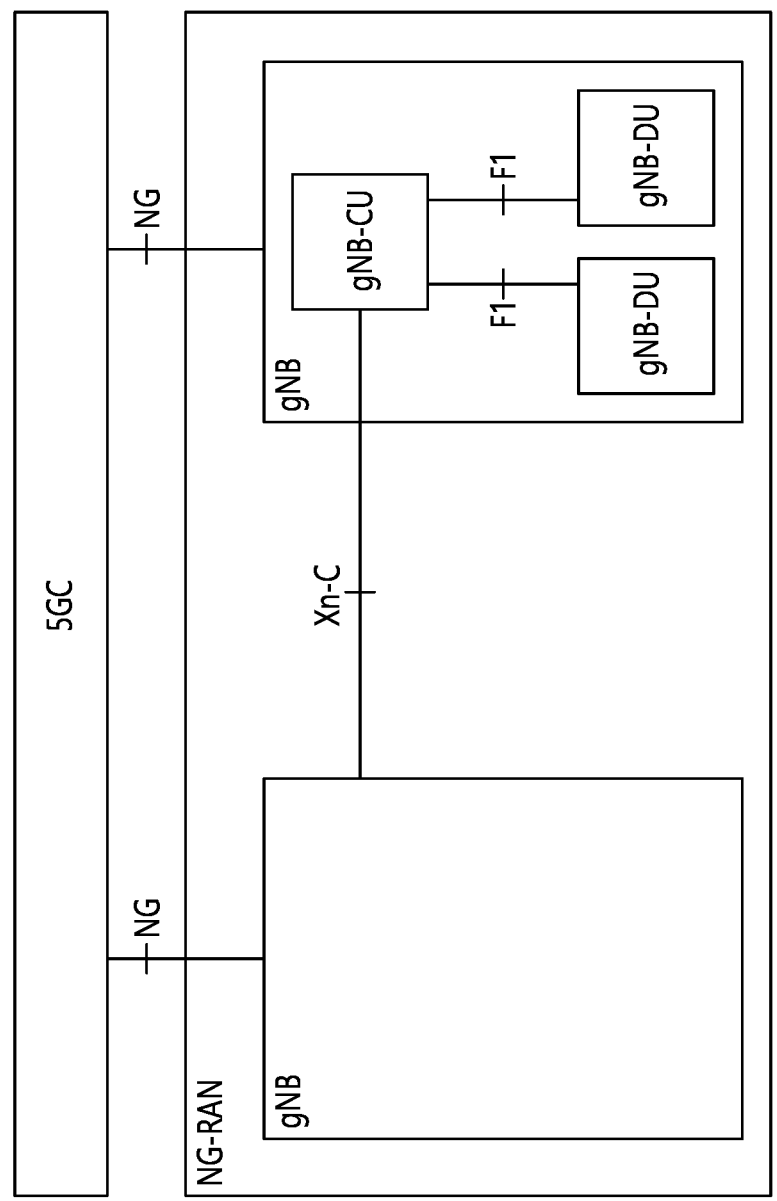
FIG. 7 shows an example of the overall architecture of an NG-RAN to which technical features of the present disclosure can be applied.

FIG. 7 shows an example of the overall architecture of an NG-RAN to which technical features of the present disclosure can be applied.

Referring to FIG. 7, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration update functions allow to inform the single network slice selection assistance information (S-NSSAI) supported by the gNB-DU.

The F1 resource coordination function is used to transfer information about frequency resource sharing between gNB-CU and gNB-DU.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU. For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. For NG-RAN, the gNB-CU provides an aggregated DRB QoS profile and QoS flow profile to the gNB-DU, and the gNB-DU either accepts the request or rejects it with appropriate cause value. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging Function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging assignment (PA). The gNB-DU consolidates all the paging records for a particular PO, PF and PA, and encodes the final RRC message and broadcasts the paging message on the respective PO, PF in the PA.

(6) Warning Messages Information Transfer Function

This function allows to cooperate with the warning message transmission procedures over NG interface. The gNB-CU is responsible for encoding the warning related SI message and sending it together with other warning related information for the gNB-DU to broadcast over the radio interface.

Figure 8:
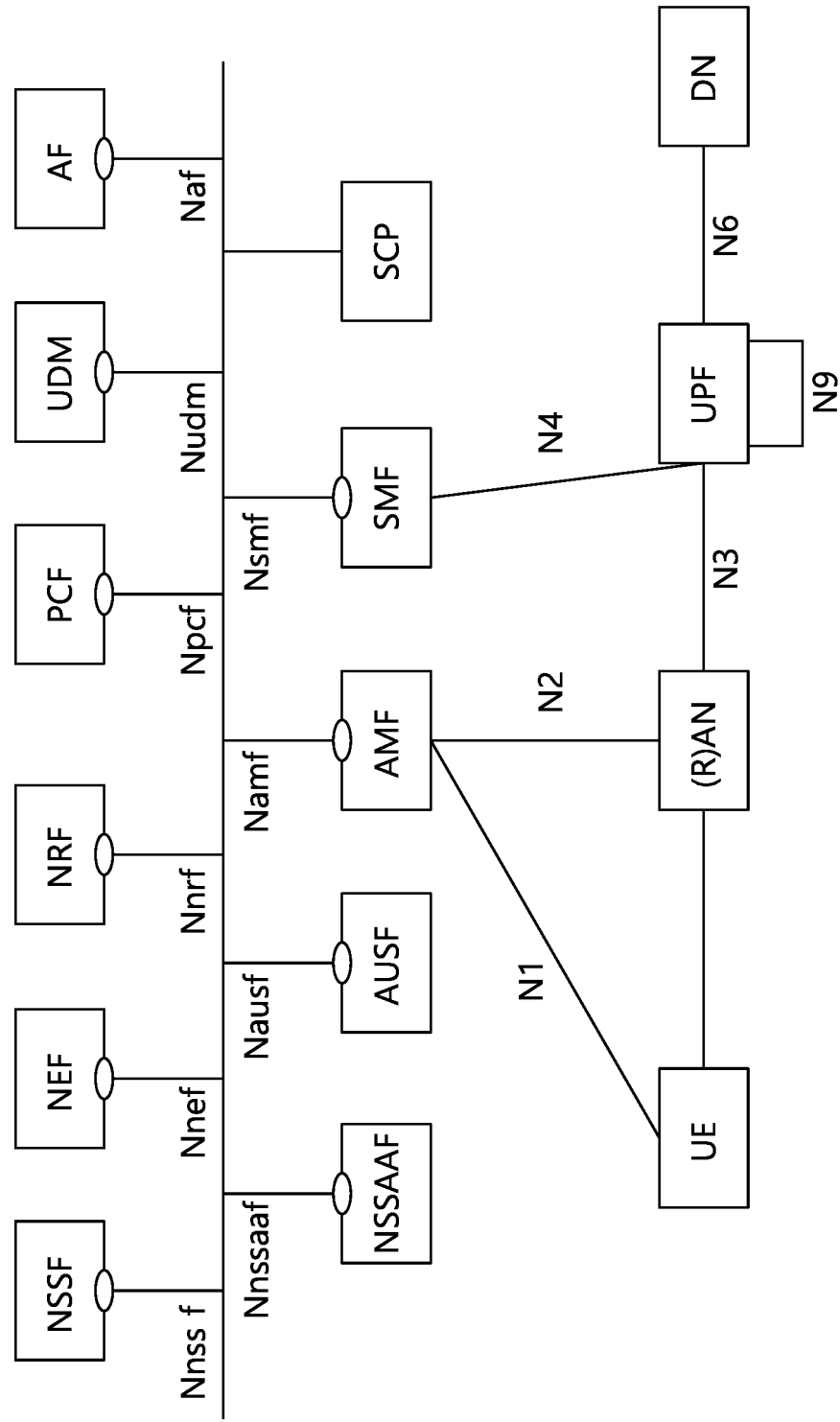
FIG. 8 shows an example of a system architecture for a communication system to which technical features of the present disclosure can be applied.

FIG. 8 shows an example of a system architecture for a communication system to which technical features of the present disclosure can be applied. An example of the communication system may comprise a 5G system and/or NR system.

Referring to FIG. 8, the communication system may comprise various core network entities, such as an access and mobility management function (AMF), a session management function (SMF), a user plane function (UPF), a policy control function (PCF), an authentication server function (AUSF), a unified data management (UDM), an application function (AF), a network exposure function (NEF), a network function repository function (NRF), a network slice selection function (NSSF), a network slice specific authentication and authorization function (NS-SAAF) and a service communication proxy (SCP).

The AMF may support a termination of non-access stratum (NAS) signalling, NAS ciphering & integrity protection, registration management, connection management, mobility management, access authentication and authorization, security context management. The AMF may be associated with N1, N2 and Namf. The N1 is a reference point between the UE and the AMF. The N2 is a reference point between the RAN and the AMF. The Namf is a service-based interface exhibited by the AMF.

The SMF may support a session management (session establishment, modification, release), UE internet protocol (IP) address allocation & management, dynamic host configuration protocol (DHCP) functions, termination of NAS signalling related to session management, DL data notification, traffic steering configuration for UPF for proper traffic routing. The SMF may be associated with N4 and Nsmf. The N4 is a reference point between the SMF and the UPF. The Nsmf is a service-based interface exhibited by the SMF.

The UPF may support packet routing & forwarding, packet inspection, quality of service (QoS) handling, acts as external protocol data unit (PDU) session point of interconnect to Data Network (DN), and may be an anchor point for intra- & inter-radio access technology (RAT) mobility. The UPF may be associated with N3, N4, N6 and N9. The N3 is a reference point between the RAN and the UPF. The N6 is a reference point between the UPF and the DN. The N9 is a reference point between two UPFs.

The PCF may support unified policy framework, providing policy rules to control plane (CP) functions, access subscription information for policy decisions in a unified data repository (UDR). The PCF may be associated with Npcf. The Npcf is a service-based interface exhibited by the PCF.

The AUSF may act as an authentication server. The AUSF may be associated with Nausf. The Nausf is a service-based interface exhibited by the AUSF.

The UDM may support generation of Authentication and Key Agreement (AKA) credentials, user identification handling, access authorization, subscription management. The UDM may be associated with Nudm. The Nudm is a service-based interface exhibited by the UDM.

The AF may support application influence on traffic routing, accessing NEF, interaction with policy framework for policy control. The AF may be associated with Naf. The Naf is a service-based interface exhibited by the AF.

The NEF may support exposure of capabilities and events, secure provision of information from external application to 3GPP network, translation of internal/external information. The NEF may be associated with Nnef. The Nnef is a service-based interface exhibited by the NEF.

The NRF may support service discovery function, maintains NF profile and available NF instances. The NRF may be associated with Nnrf. The Nnrf is a service-based interface exhibited by the NRF.

The NSSF may support selecting of the Network Slice instances to serve the UE, determining the allowed network slice selection assistance information (NSSAI), determining the AMF set to be used to serve the UE. The NSSF may be associated with Nnssf. The Nnssf is a service-based interface exhibited by the NSSF.

The NSSAAF may support Network Slice-Specific Authentication and Authorization with a AAA Server (AAA-S). If the AAA-S belongs to a third party, the NSSAAF may contact the AAA-S via an a AAA proxy (AAA-P). The NSSAAF may be associated with Nnssaaf. The Nnssaaf is a service-based interface exhibited by the NSSAAF.

The SCP may support indirect communication, delegated discovery, message forwarding and routing to destination network function (NF)/NF service, Message forwarding and routing to a next hop SCP, communication security (e.g. authorization of the NF Service Consumer to access the NF Service Producer API), load balancing, monitoring, overload control, optionally interact with UDR, to resolve the UDM Group ID/UDR Group ID/AUSF Group ID/PCF Group ID/charging function (CHF) Group ID/home subscriber server (HSS) Group ID based on UE identity (e.g., subscription permanent identifier (SUPI) or international mobility subscriber identity (IMPI)/IP multimedia public identity (IMPU)).

Figure 9:
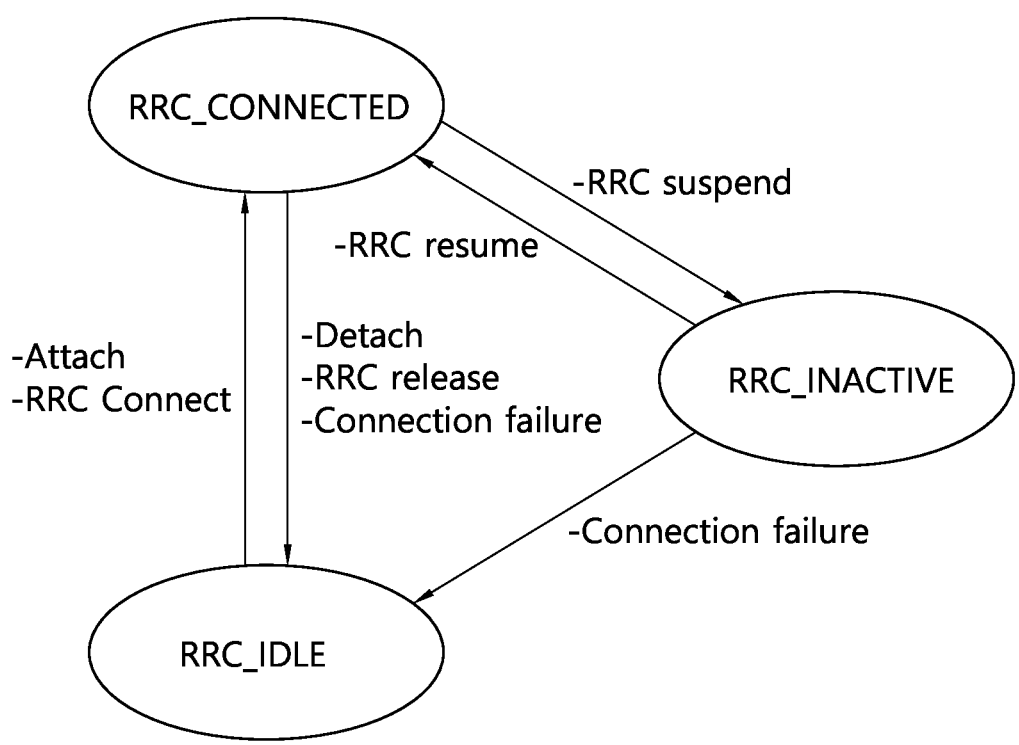
FIG. 9 shows an example of possible RRC states in a wireless communication system to which technical features of the present disclosure can be applied.

FIG. 9 shows an example of possible RRC states in a wireless communication system to which technical features of the present disclosure can be applied.

Referring to FIG. 9, there may be 3 possible RRC states in a wireless communication system (i.e., RRC_IDLE, RRC_CONNECTED and/or RRC_IDLE).

In RRC_IDLE (or, idle mode/state), RRC context for communication between a UE and a network may not be established in RAN, and the UE may not belong to a specific cell. Also, in RRC_IDLE, there is no core network connection for the UE. Since the device remains in sleep mode in most of the time to reduce battery consumption, data transfer between the UE and the network may not occur. UEs in RRC_IDLE may periodically wake-up to receive paging messages from the network. Mobility may be handled by the UE through cell reselection. Since uplink synchronization is not maintained, the UE may not perform uplink transmission other than transmissions for random access (e.g., random access preamble transmission) to move to RRC_CONNECTED.

In RRC_CONNECTED (or, connected state/mode), RRC context for communication between a UE and a network may be established in RAN. Also, in RRC_CONNECTED, core network connection is established for the UE. Since the UE belongs to a specific cell, cell—radio network temporary identifier (C-RNTI) for signalings between the UE and the network may be configured for the UE. Data transfer between the UE and the network may occur. Mobility may be handled by the network—that is, the UE may provide measurement report to the network, and the network may transmit mobility commands to the UE to perform a mobility. Uplink time alignment may need to be established based on a random access and maintained for data transmission.

In RRC_INACTIVE (or, inactive state/mode), RRC context for communication between a UE and a network may be kept in RAN. Data transfer between the UE and the network may not occur. Since core network connection may also be kept for the UE, the UE may fast transit to a connected state for data transfer. In the transition, core network signalling may not be needed. The RRC context may be already established in the network and idle-to-active transitions can be handled in the RAN. The UE may be allowed to sleep in a similar way as in RRC_IDLE, and mobility may be handled through cell reselection without involvement of the network. The RRC_INCATIVE may be construed as a mix of the idle state and the connected state.

As illustrated in FIG. 9, the UE may transit to RRC_CONNECTED from RRC_IDLE by performing initial attach procedure or RRC connection establishment procedure. The UE may transit to RRC_IDLE from RRC_CONNECTED when detach, RRC connection release and/or connection failure (e.g., radio link failure (RLF)) has occurred. The UE may transit to RRC_INACTIVE from RRC_INACTIVE when RRC connection is suspended, and transit to RRC_CONNECTED from RRC_INACTIVE when RRC connection is resume. The UE may transit to RRC_IDLE from RRC_INACTIVE when connection failure such as RLF has occurred.

Figure 10:
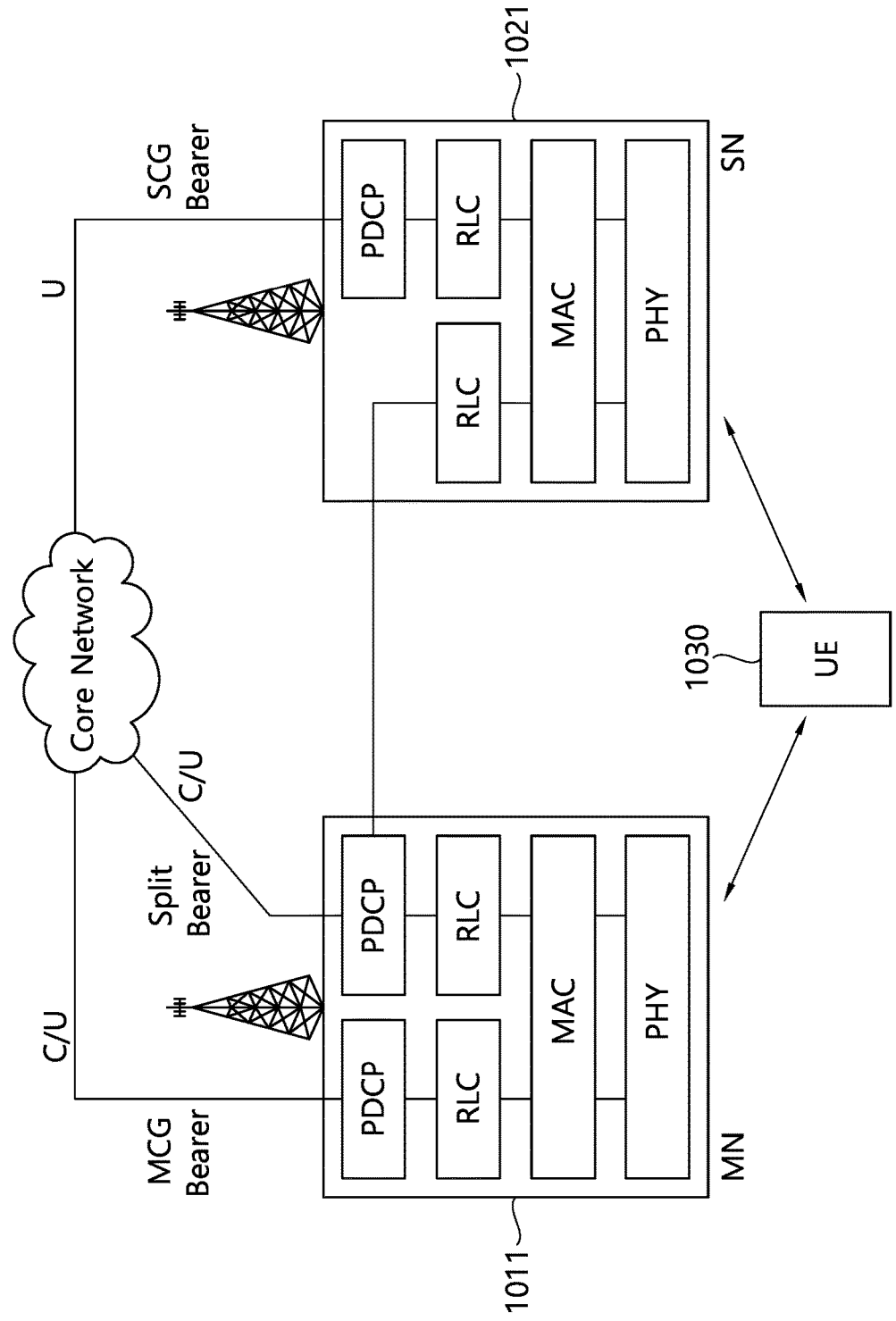
FIG. 10 shows an example of a dual connectivity (DC) architecture to which technical features of the present disclosure can be applied.

FIG. 10 shows an example of a dual connectivity (DC) architecture to which technical features of the present disclosure can be applied.

Referring to FIG. 10, MN 1011, SN 1021, and a UE 1030 communicating with both the MN 1011 and the SN 1021 are illustrated. As illustrated in FIG. 10, DC refers to a scheme in which a UE (e.g., UE 1030) utilizes radio resources provided by at least two RAN nodes comprising a MN (e.g., MN 1011) and one or more SNs (e.g., SN 1021). In other words, DC refers to a scheme in which a UE is connected to both the MN and the one or more SNs, and communicates with both the MN and the one or more SNs. Since the MN and the SN may be in different sites, a backhaul between the MN and the SN may be construed as non-ideal backhaul (e.g., relatively large delay between nodes).

MN (e.g., MN 1011) refers to a main RAN node providing services to a UE in DC situation. SN (e.g., SN 1021) refers to an additional RAN node providing services to the UE with the MN in the DC situation. If one RAN node provides services to a UE, the RAN node may be a MN. SN can exist if MN exists.

For example, the MN may be associated with macro cell whose coverage is relatively larger than that of a small cell. However, the MN does not have to be associated with macro cell—that is, the MN may be associated with a small cell. Throughout the disclosure, a RAN node that is associated with a macro cell may be referred to as 'macro cell node'. MN may comprise macro cell node.

For example, the SN may be associated with small cell (e.g., micro cell, pico cell, femto cell) whose coverage is relatively smaller than that of a macro cell. However, the SN does not have to be associated with small cell—that is, the SN may be associated with a macro cell. Throughout the disclosure, a RAN node that is associated with a small cell may be referred to as 'small cell node'. SN may comprise small cell node.

The MN may be associated with a master cell group (MCG). MCG may refer to a group of serving cells associated with the MN, and may comprise a primary cell (PCell) and optionally one or more secondary cells (SCells). User plane data and/or control plane data may be transported from a core network to the MN through a MCG bearer. MCG bearer refers to a bearer whose radio protocols are located in the MN to use MN resources. As shown in FIG. 10, the radio protocols of the MCG bearer may comprise PDCP, RLC, MAC and/or PHY.

The SN may be associated with a secondary cell group (SCG). SCG may refer to a group of serving cells associated with the SN, and may comprise a primary secondary cell (PSCell) and optionally one or more SCells. User plane data may be transported from a core network to the SN through a SCG bearer. SCG bearer refers to a bearer whose radio protocols are located in the SN to use SN resources. As shown in FIG. 10, the radio protocols of the SCG bearer may comprise PDCP, RLC, MAC and PHY.

User plane data and/or control plane data may be transported from a core network to the MN and split up/duplicated in the MN, and at least part of the split/duplicated data may be forwarded to the SN through a split bearer. Split bearer refers to a bearer whose radio protocols are located in both the MN and the SN to use both MN resources and SN resources. As shown in FIG. 10, the radio protocols of the split bearer located in the MN may comprise PDCP, RLC, MAC and PHY. The radio protocols of the split bearer located in the SN may comprise RLC, MAC and PHY.

According to various embodiments, PDCP anchor/PDCP anchor point/PDCP anchor node refers to a RAN node comprising a PDCP entity which splits up and/or duplicates data and forwards at least part of the split/duplicated data over X2/Xn interface to another RAN node. In the example of FIG. 10, PDCP anchor node may be MN.

According to various embodiments, the MN for the UE may be changed. This may be referred to as handover, or a MN handover.

According to various embodiments, a SN may newly start providing radio resources to the UE, establishing a connection with the UE, and/or communicating with the UE (i.e., SN for the UE may be newly added). This may be referred to as a SN addition.

According to various embodiments, a SN for the UE may be changed while the MN for the UE is maintained. This may be referred to as a SN change.

According to various embodiments, DC may comprise E-UTRAN NR-DC (EN-DC), and/or multi-radio access technology (RAT)-DC (MR-DC). EN-DC refers to a DC situation in which a UE utilizes radio resources provided by E-UTRAN node and NR RAN node. MR-DC refers to a DC situation in which a UE utilizes radio resources provided by RAN nodes with different RATs.

Figure 11:
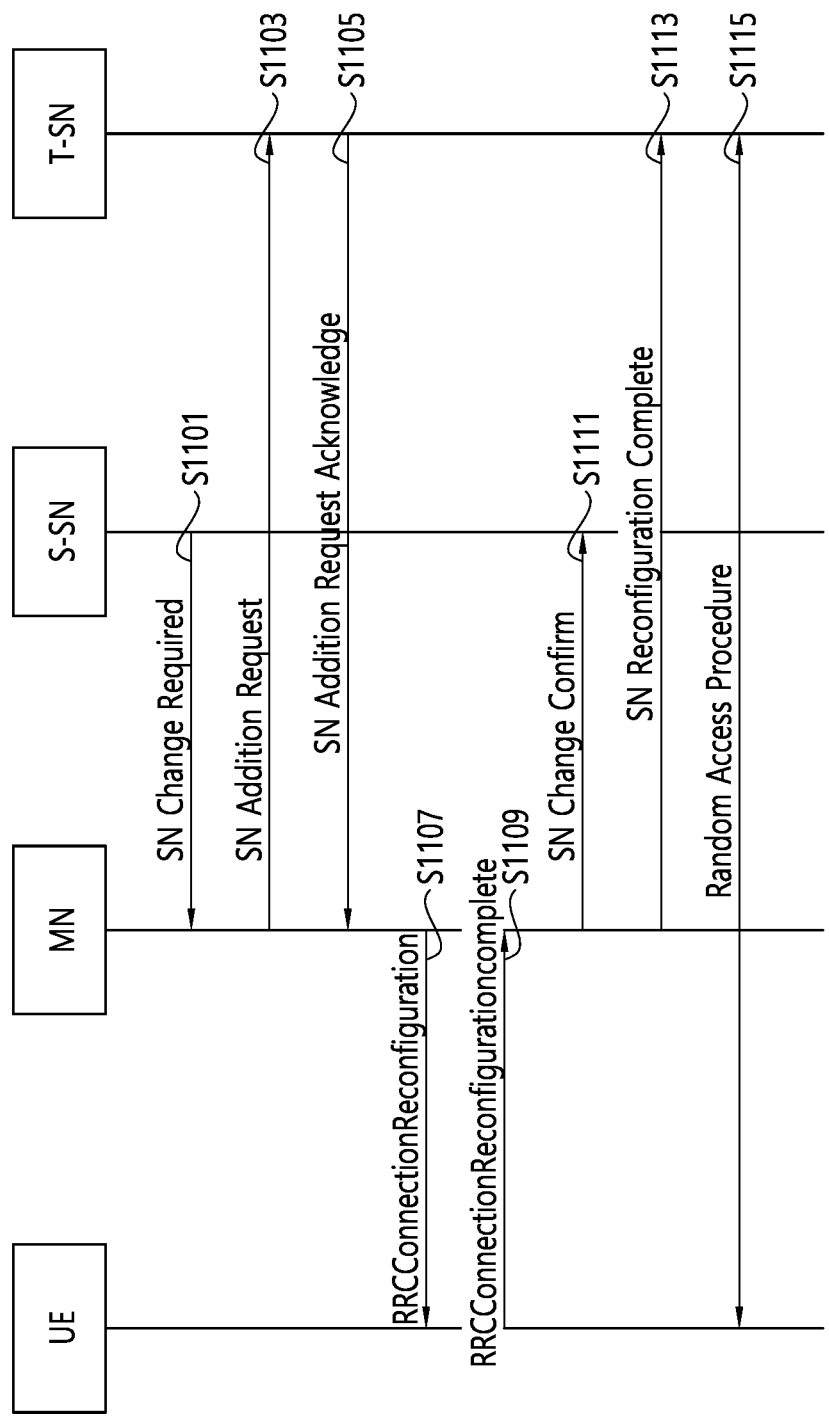
FIG. 11 shows an example of a SN change procedure to which technical features of the present disclosure can be applied.

FIG. 11 shows an example of a SN change procedure to which technical features of the present disclosure can be applied.

Steps illustrated in FIG. 11 may be related to an SN-initiated SN change procedure. The SN initiated SN change procedure may be used to transfer a UE context from a source SN to a target SN and to change a SCG configuration in UE from one SN to another.

Referring to FIG. 11, in step S1101, the source SN may initiate the SN change procedure by sending a SN Change Required message, which contains a candidate target node ID and may include the SCG configuration (to support delta configuration) and measurement results related to the target SN.

In step S1103, the MN may transmit SN addition request message to the target SN. The MN may request the target SN to allocate resources for the UE by means of the SN Addition procedure, including the measurement results related to the target SN received from the source SN.

In step S1105, the target SN may transmit SN addition request acknowledgement (ACK) message to the MN. If data forwarding is needed, the target SN may provide data forwarding addresses to the MN. The target SN may include the indication of the full or delta RRC configuration.

In step S1107, the MN may trigger the UE to apply the new configuration. The MN may indicate the new configuration to the UE in the MN RRC reconfiguration message including the SN RRC reconfiguration message generated by the target SN.

In step S1109, the UE may apply the new configuration and send the MN RRC reconfiguration complete message, including the SN RRC response message for the target SN, if needed. In case the UE is unable to comply with (part of) the configuration included in the MN RRC reconfiguration message, the UE may perform the reconfiguration failure procedure.

In step S1111, if the allocation of target SN resources was successful, the MN may confirm the change of the source SN. If data forwarding is needed, the MN may provide data forwarding addresses to the source SN. If direct data forwarding is used for SN terminated bearers, the MN may provide data forwarding addresses as received from the target SN to source SN. Reception of the SN Change Confirm message may trigger the source SN to stop providing user data to the UE and, if applicable, to start data forwarding.

In step S1113, if the RRC connection reconfiguration procedure was successful, the MN may inform the target SN via SN Reconfiguration Complete message with the included SN RRC response message for the target SN, if received from the UE.

In step S1115, the UE may synchronize to the target SN.

After step S1115, if PDCP termination point is changed for bearers using RLC AM, the source SN may send the SN Status Transfer, which the MN sends then to the target SN, if needed.

If applicable, data forwarding from the source SN may take place. The data forwarding from the source SN may be initiated as early as the source SN receives the SN Change Confirm message from the MN.

The source SN may send the Secondary RAT Data Usage Report message to the MN and include the data volumes delivered to and received from the UE. The SN may send the Secondary RAT Data Usage Report message when the transmission of the related QoS flow is stopped.

If applicable, a PDU Session path update procedure may be triggered by the MN.

Upon reception of the UE Context Release message, the source SN may release radio and C-plane related resources associated to the UE context. Any ongoing data forwarding may continue.

Figure 12:
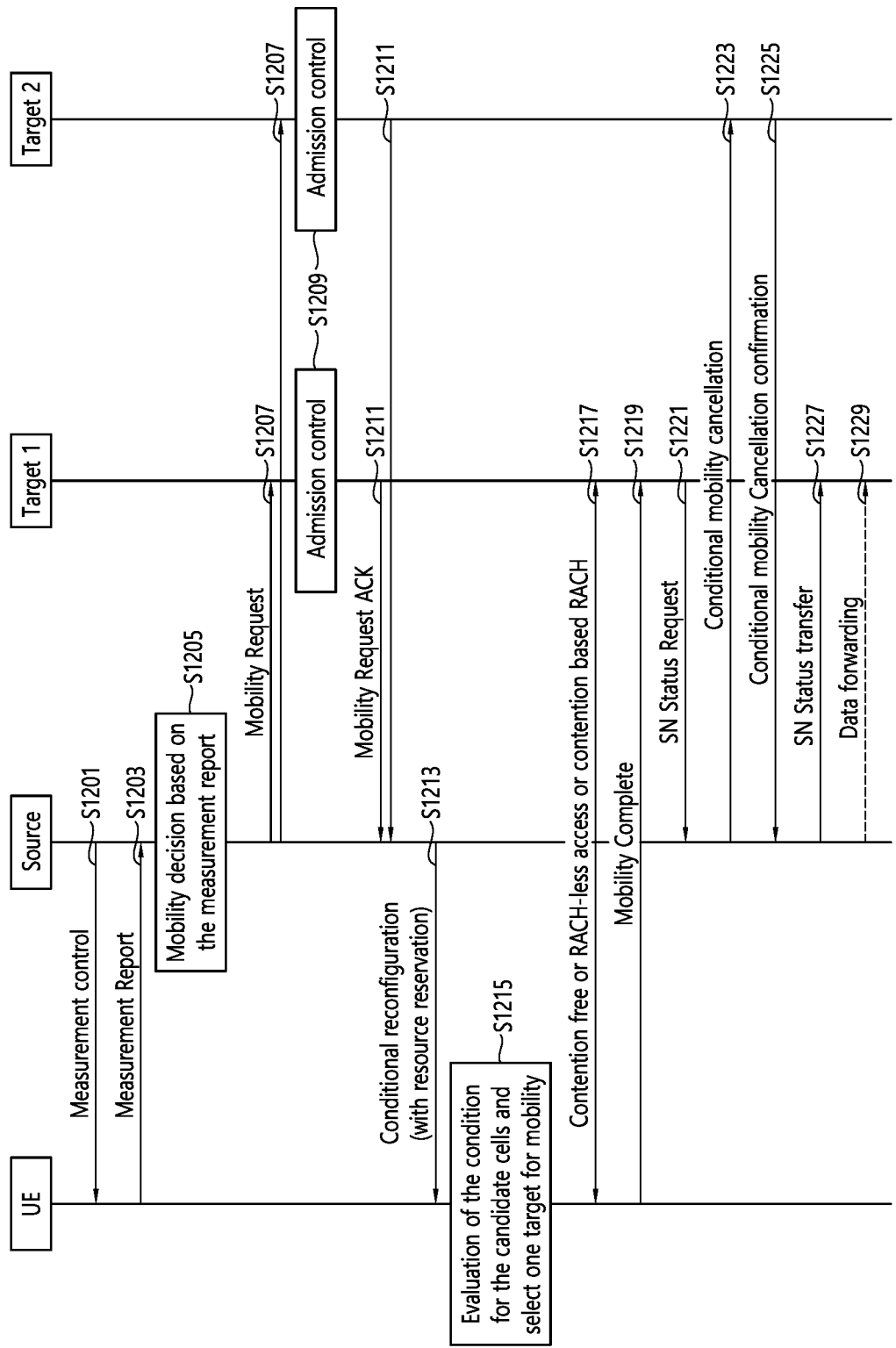
FIG. 12 shows an example of a conditional mobility procedure to which technical features of the present disclosure can be applied.

FIG. 12 shows an example of a conditional mobility procedure to which technical features of the present disclosure can be applied. The steps illustrated in FIG. 12 can also be applied to a conditional handover procedure, conditional SN addition procedure and/or conditional SN change procedure.

Referring to FIG. 12, in step S1201, the source cell may transmit measurement control message to the UE. The source cell may configure the UE measurement procedures according to the roaming and access restriction information and, for example, the available multiple frequency band information through the measurement control message. Measurement control information provided by the source cell through the measurement control message may assist the function controlling the UE's connection mobility. For example, the measurement control message may comprise measurement configuration and/or report configuration.

In step S1203, the UE may transmit a measurement report message to the source cell. The measurement report message may comprise a result of measurement on neighbor cell(s) around the UE which can be detected by the UE. The UE may generate the measurement report message according to a measurement configuration and/or measurement control information in the measurement control message received in step S1201.

In step S1205, the source cell may make a mobility decision based on the measurement report. For example, the source cell may make a mobility decision and determine candidate target cells (e.g., target cell 1 and target cell 2) for mobility among neighbor cells around the UE based on a result of measurement (e.g., signal quality, reference signal received power (RSRP), reference signal received quality (RSRP)) on the neighbor cells.

In step S1207, the source cell may transmit mobility request messages to the target cell 1 and the target cell 2 which are determined in step S1205. That is, the source cell may perform mobility preparation with the target cell 1 and the target cell 2. The mobility request message may comprise necessary information to prepare the mobility at the target side (e.g., target cell 1 and target cell 2).

In step S1209, each of the target cell 1 and the target cell 2 may perform an admission control based on information included in the mobility request message. The target cell may configure and reserve the required resources (e.g., C-RNTI and/or RACH preamble). The AS-configuration to be used in the target cell can either be specified independently (i.e. an "establishment") or as a delta compared to the AS-configuration used in the source cell (i.e. a "reconfiguration").

In step S1211, the target cell and the target cell 2 may transmit a mobility request acknowledge (ACK) message to the source cell. The mobility request ACK message may comprise information on resources reserved and prepared for a mobility. For example, the mobility request ACK message may comprise a transparent container to be sent to the UE as an RRC message to perform the mobility. The container may include a new C-RNTI, target gNB security algorithm identifiers for the selected security algorithms, a dedicated RACH preamble, and/or possibly some other parameters i.e. access parameters, SIBs. If RACH-less mobility is configured, the container may include timing adjustment indication and optionally a preallocated uplink grant. The mobility request ACK message may also include RNL/TNL information for forwarding tunnels, if necessary. As soon as the source cell receives the mobility request ACK message, or as soon as the transmission of the conditional mobility command is initiated in the downlink, data forwarding may be initiated.

In step S1213, the source cell may transmit a conditional reconfiguration to the UE. The conditional reconfiguration may be also referred to as (or, may comprise) conditional handover (CHO) configuration and/or a conditional mobility command (e.g., CHO command). The conditional reconfiguration may comprise a conditional reconfiguration for each of the candidate target cells (e.g., target cell 1, target cell 2). For example, the conditional reconfiguration may comprise a conditional reconfiguration for the target cell 1, and a conditional reconfiguration for the target cell 2. The conditional reconfiguration for the target cell 1 may comprise a mobility condition for the target cell 1, and a target cell configuration for the target cell 1. The target cell configuration for the target cell 1 may comprise RRC reconfiguration parameters associated with a mobility to the target cell 1, including information on resources reserved for the mobility to the target cell 1. Similarly, the conditional reconfiguration for the target cell 2 may comprise a mobility condition for the target cell 2, and a target cell configuration for the target cell 2. The target cell configuration for the target cell 2 may comprise RRC reconfiguration parameters associated with a mobility to the target cell 2, including information on resources reserved for the mobility to the target cell 2.

The mobility condition may inform at least one measurement ID. For example, the mobility condition may inform at most 2 measurement IDs. If a mobility condition of a target cell informs a measurement ID which is related to a measurement object A and a report configuration B, evaluating the mobility condition may comprise determining whether a measurement result on the measurement object A satisfies a report condition in the report configuration B. If the measurement result on the measurement object A satisfies the report condition in the report configuration B according to the evaluation of the mobility condition, the UE may determine that the mobility condition of the target cell is satisfied (or, the target cell/measurement result for the target cell satisfies the mobility condition of the target cell), and perform a mobility to the target cell.

In step S1215, the UE may perform an evaluation of the mobility condition for the candidate target cells (e.g., target cell 1, target cell 2) and select a target cell for a mobility among the candidate target cells. For example, the UE may perform measurements on the candidate target cells, and determine whether a candidate target cell satisfies a mobility condition for the candidate target cell among the candidate target cells based on a result of the measurements on the candidate target cells. If the UE identifies that the target cell 1 satisfies a mobility condition for the target cell 1, the UE may select the target cell 1 as a target cell for the mobility.

In step S1217, the UE may perform a random access to the selected target cell (e.g., target cell 1). For example, the UE may transmit a random access preamble to the target cell 1, and receive a random access response comprising an uplink grant from the target cell 1. If RACH-less mobility is configured, the step S1217 may be omitted, and the uplink grant may be provided in step S1213.

In step S1219, the UE may transmit a mobility complete message to the target cell 1. When the UE has successfully accessed the target cell 1 (or, received uplink grant when RACH-less mobility is configured), the UE may transmit a mobility complete message comprising a C-RNTI to confirm the mobility, along with uplink buffer status report, whenever possible, to the target cell 1 to indicate that the mobility procedure is completed for the UE. The target cell 1 may verify the C-RNTI transmitted in the mobility complete message.

In step S1221, the target cell 1 may transmit a sequence number (SN) status request message to the source cell. The target cell 1 may request the source cell to inform the target cell 1 of a SN of a packet the target cell 1 has to transmit after the mobility, via the SN status request message.

In step S1223, the source cell may transmit a conditional mobility cancellation message to the target cell 2 which is not selected as a target cell for a mobility among the candidate target cells. After receiving the conditional mobility cancellation message, the target cell 2 may release resources that are reserved in case of a mobility.

In step S1225, the target cell 2 may transmit a conditional mobility cancellation confirmation message to the source cell, as a response for the conditional mobility cancellation message. The conditional mobility cancellation confirmation message may inform that the target cell 2 has released resources reserved in case of a mobility.

In step S1227, the source cell may transmit a SN status transfer message to the target cell 1, as a response for the SN status request message. The SN status transfer message may inform the target cell 1 of a SN of a packet the target cell 1 has to transmit after the mobility.

In step S1229, the source cell may perform a data forwarding to the target cell 1. For example, the source cell may forward data received from a core network to the target cell 1 so that the target cell 1 can now transmit the data to the UE.

Hereinafter, activity notification is described.

For EN-DC, the activity notification function may be used to report user plane activity within SN resources. The activity notification function may be used to either report inactivity or resumption of activity after inactivity was reported. In EN-DC, the activity reporting may be provided from the SN only. The MN may take further actions.

Support of activity notification in EN-DC may be used to keep the MN informed about user traffic activity in resources owned by the SN. The MN may take appropriate action upon receiving such notification.

For example, the SN may transmit an activity notification message informing a user data inactivity of resources owned by the SN to the MN. After/upon receiving the activity notification message, the MN may decide to keep SN resources. After a while, the SN may transmit an activity notification message informing a resumption of user plane activity.

For MR-DC with 5GC, the activity notification function may be used to report user plane activity within SN resources or to report a RAN paging failure event to the SN. The activity notification function may be used to either report inactivity or resumption of activity after inactivity was reported. In MR-DC with 5GC, the activity reporting may be provided from the SN only. The MN may take further actions. RAN paging failure reporting may be provided from the MN only.

For example, the SN may transmit the activity notification message informing a user data inactivity. After/upon receiving the activity notification message, the MN may decide further actions that impact SN resources (e.g., send UE to RRC_INACTIVE, bearer reconfiguration). For example, MN may take no action. After a while, the SN may transmit an activity notification message informing a resumption of user plane activity to the MN, notifying the MN that the (UE or PDU Session or QoS flow) is no longer inactive.

According to various embodiments of the present disclosure, the activity notification message (or, activity notification) may be transmitted from the SN to the MN. The activity notification message may indicate an activity status for SN resources (i.e., resources owned by the SN) and/or SN terminated bearers.

The activity status may comprise:
- user plane/data/traffic inactivity (i.e., inactivity status information); or
- a resumption/reactivation of user plane/data/traffic activity (i.e., activity status information).

Figure 13A:
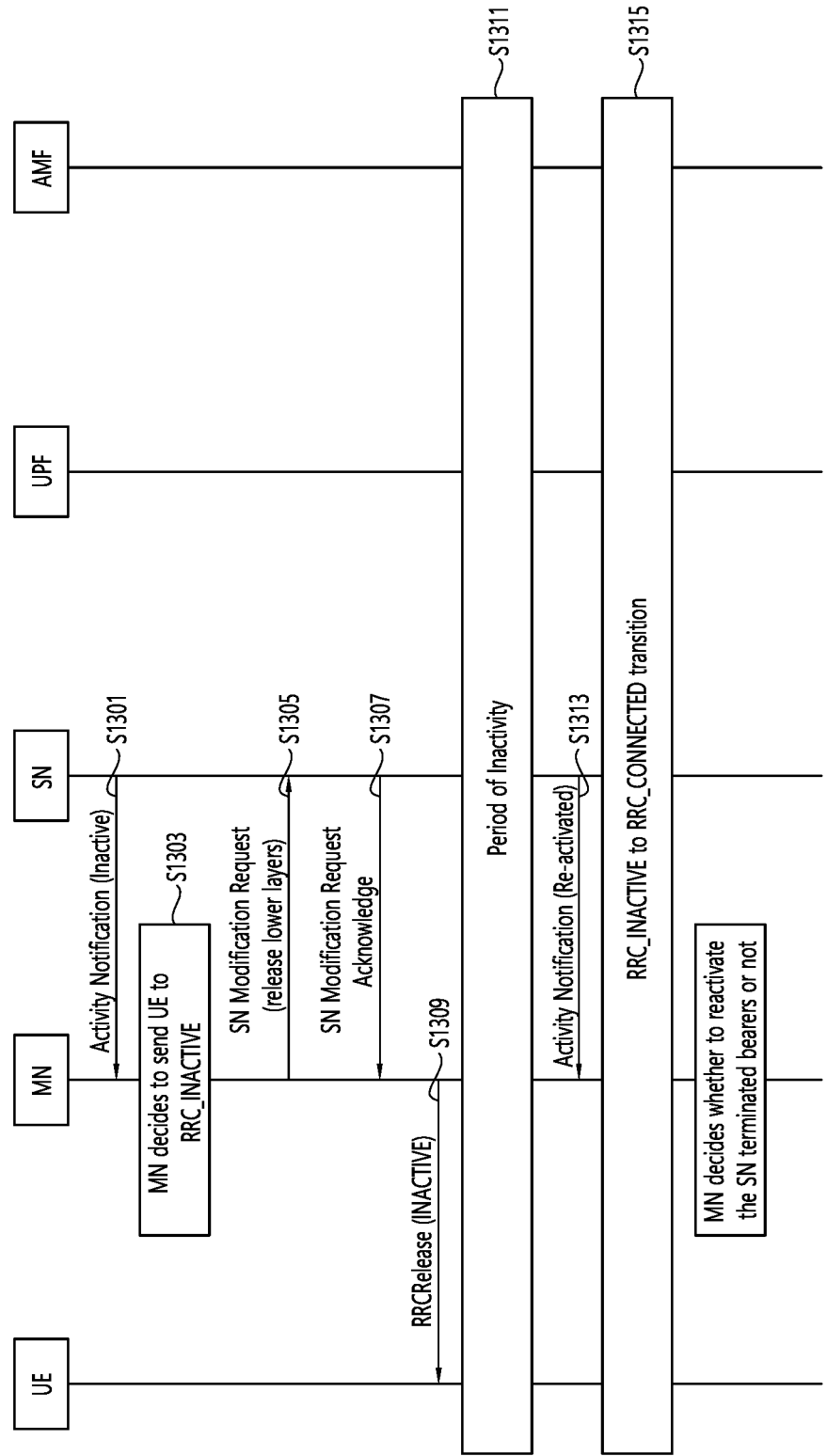
FIGS. 13A and 13B show a first example of MR-DC with 5GC with RRC_INACTIVE to which technical features of the present disclosure can be applied.
Figure 13B:
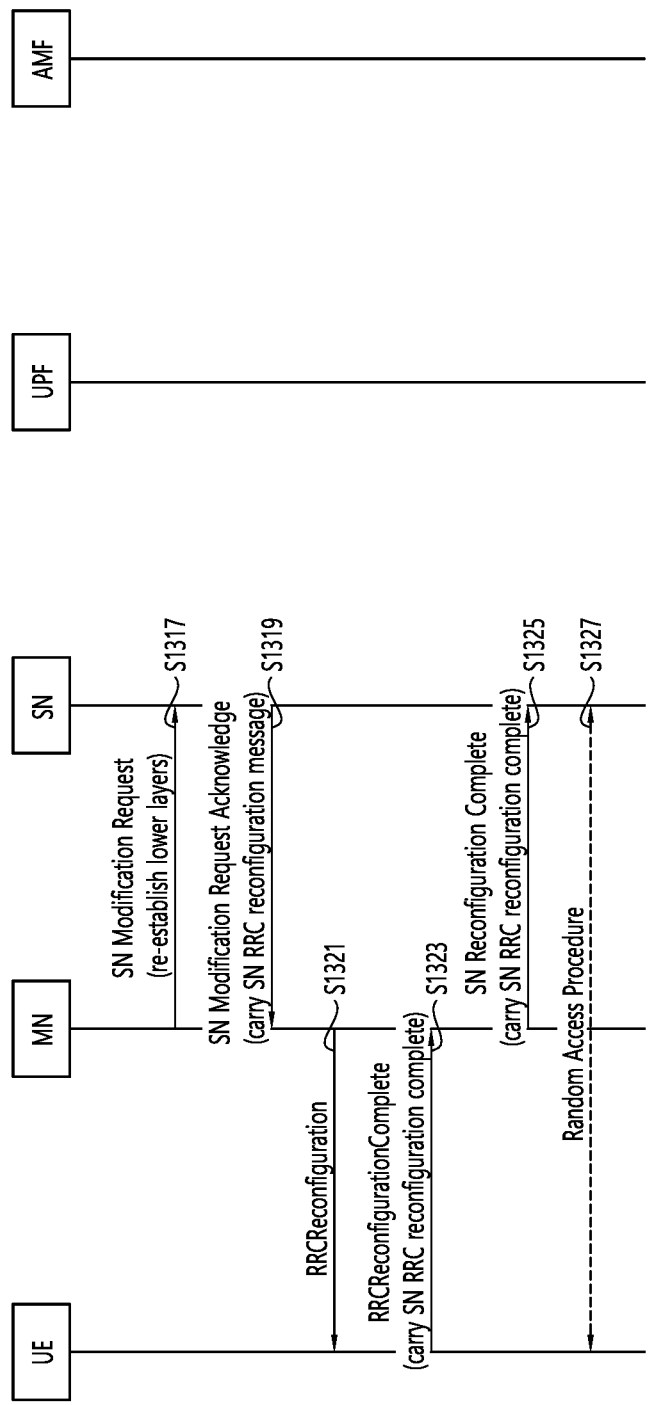

FIGS. 13A and 13B show a first example of MR-DC with 5GC with RRC_INACTIVE to which technical features of the present disclosure can be applied.

The activity notification function may be used to enable MR-DC with 5GC with RRC_INACTIVE operation. The MN node may decide, after inactivity is reported from the SN and also MN resources show no activity, to send the UE to RRC_INACTIVE. Resumption to RRC_CONNECTED may take place after activity is reported from the SN for SN terminated bearers.

FIGS. 13A and 13B shows how activity notification function interacts with NG-RAN functions for RRC_INACTIVE and SN modification procedures in order to keep the higher layer MR-DC NG-RAN resources established for UEs in RRC_INACTIVE, including NG and Xn interface C-plane, U-plane and bearer contexts established while lower layer MCG and SCG resources are released. NG-RAN may memorise the cell group configuration for MCG in order to apply delta signalling at resume. After the UE has transited successfully back to RRC_CONNECTED, lower layer SCG resources may be established afterwards by means of RRC connection reconfiguration.

Referring to FIG. 13A, in step S1301, the SN may transmit an activity notification message indicating a user data inactivity for SN terminated bearers to the MN.

In step S1303, the MN may decide to send the UE to RRC_INACTIVE.

In step S1305, the MN may transmit an SN modification request message indicating to release lower layers to the SN. The MN may trigger the MN initiated SN Modification procedure, requesting the SN to release lower layers.

In step S1307, the SN may transmit a SN modification request acknowledge (ACK) message, as a response for the SN modification request message.

In step S1309, the UE may be sent to RRC_INACTIVE.

In step S1311, a period of inactivity may proceed.

In step S1313, after the period of inactivity, the SN may transmit an activity notification a resumption/reactivation of user data activity to the MN.

In step S1315, the UE may return to RRC_CONNECTED.

In an example, the MN may decide whether to reactivate the SN terminated bearers. If (e.g. due to UE mobility), MN decides not to reactivate the SN terminated bearers, the MN may initiate the MN initiated SN release procedure and the procedure may end.

Steps in FIG. 13A may continue to those in FIG. 13B.

Referring to FIG. 13B, in step S1317, the MN may trigger the MN initiated SN modification procedure to re-establish lower layers via SN modification request message.

In step S1319, the SN may transmit an SN modification request ACK message carrying SN RRC reconfiguration message to the MN. The SN may provide configuration data within the SN RRC configuration/reconfiguration message.

In step S1321 to step S1327, the RRC connection reconfiguration procedure commences.

In step S1321, the MN may transmit RRC reconfiguration message to the UE.

In step S1323, the UE may transmit RRC reconfiguration complete message carrying SN RRC reconfiguration complete to the MN.

In step S1325, the MN may transmit the SN reconfiguration complete message carrying SN RRC reconfiguration complete to the SN.

In step S1327, the UE may perform a random access procedure towards the SN.

Figure 14B:
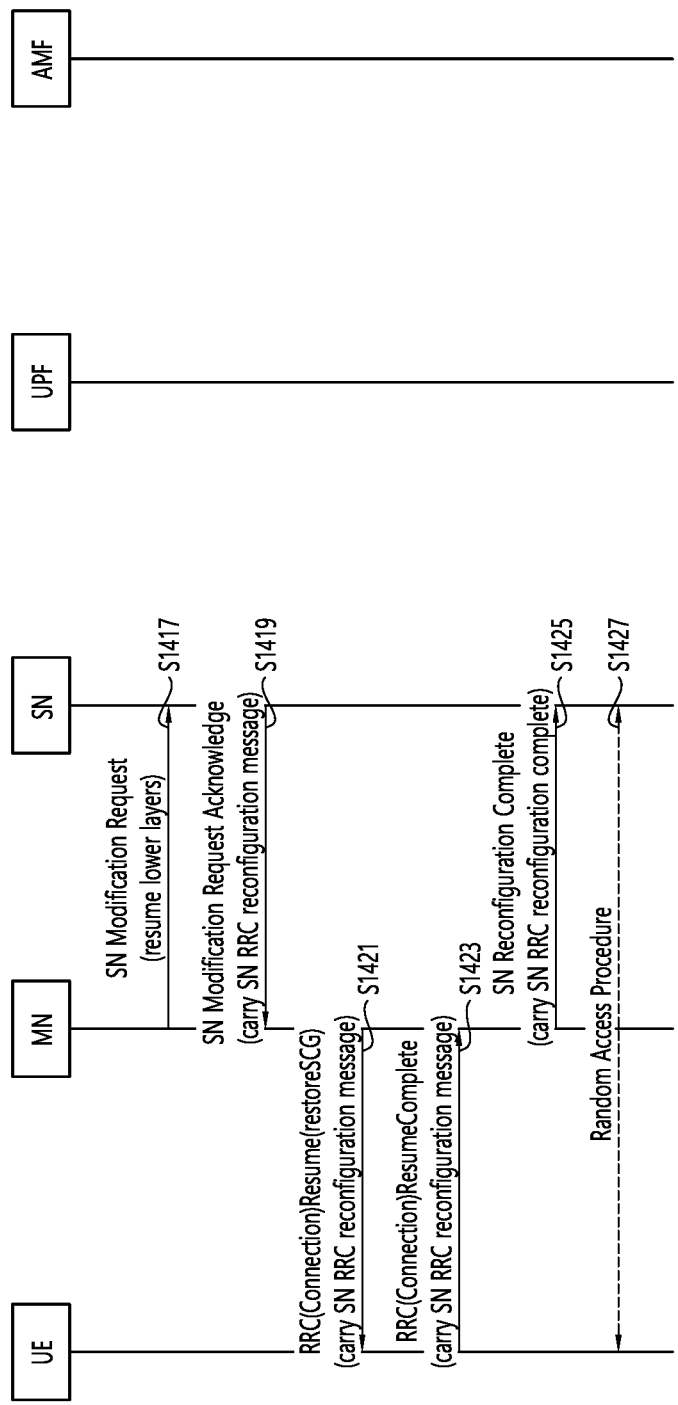

FIGS. 14A and 14B show a second example of MR-DC with 5GC with RRC_INACTIVE to which technical features of the present disclosure can be applied.

The activity notification function may be used to enable MR-DC with 5GC with RRC_INACTIVE operation. The MN node may decide, after inactivity is reported from the SN and also MN resources show no activity, to send the UE to RRC_INACTIVE, while keeping the SCG configuration. Resumption to RRC_CONNECTED may take place after activity is reported from the SN for SN terminated bearers.

FIGS. 14A and 14B show how activity notification function interacts with NG-RAN functions for RRC_INACTIVE and SN modification procedures in order to keep the full MR-DC NG-RAN resources established for UEs in RRC_INACTIVE. When the UE transits successfully back to RRC_CONNECTED, lower layer MCG and SCG configurations may be restored or reconfigured by means of RRC (Connection) resume.

Referring to FIG. 14A, in step S1401, the SN may transmit an activity notification message indicating a user data inactivity for SN terminated bearers to the MN.

In step S1403, the MN may decide to send the UE to RRC_INACTIVE.

In step S1405, the MN may transmit SN modification request message indicating to suspend lower layers to the SN. The MN may trigger the MN initiated SN Modification procedure, requesting the SN to suspend lower layers.

In step S1407, the SN may transmit SN modification request ACK message, as a response for the SN modification request message.

In step S1409, the UE may be sent to RRC_INACTIVE.

In step S1413, a period of inactivity may proceed.

In step S1413, the SN may transmit activity notification indicating a resumption/reactivation of user data activity to the MN.

In step S1415, after a period of inactivity, upon receiving the activity notification from the SN, the MN may decide to return the UE to RRC_CONNECTED.

In an embodiment, the MN may decide whether to reactivate the SN terminated bearers. If (e.g. due to UE mobility), the MN decides not to reactivate the SN terminated bearers, the MN may initiate the MN initiated SN release procedure, rather than the MN initiated SN modification procedure in step S1417 and S1419.

Steps in FIG. 14A may continue to those in FIG. 14B.

Referring to FIG. 14B, in step S1417, the MN may transmit SN modification request message indicating to resume lower layers to the SN. The MN may trigger the MN initiated SN Modification procedure to resume the SCG lower layers.

In step S1419, the SN may transmit a SN modification request ACK message carrying SN RRC reconfiguration message. If the SCG configuration needs to be updated, the SN may provide the configuration data within an SN RRC configuration message.

In step S1421 and S1423, the RRC (Connection) resume procedure may commence, where the UE is instructed to resume both the MCG and the SCG. If the SCG configuration is to be updated, the new configuration may be provided in the RRC(Connection)Resume message.

In step S1425, the MN may inform the SN that the UE has completed the reconfiguration procedure successfully, via the SN Reconfiguration Complete message, including the SN RRC response message, if received from the UE.

In step S1427, if instructed, the UE may perform synchronisation towards the PSCell of the SN.

Meanwhile, in 5G NR, the DC/CA enhancements may have become important items for enhancing 5G services. A use case may comprise how to support the low layer suspension and resumption in the secondary node including both aggregated and disaggregated case. Some inactive AS context suspend/resume may need to be considered in SN, F1 and mobility scenarios.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 15:
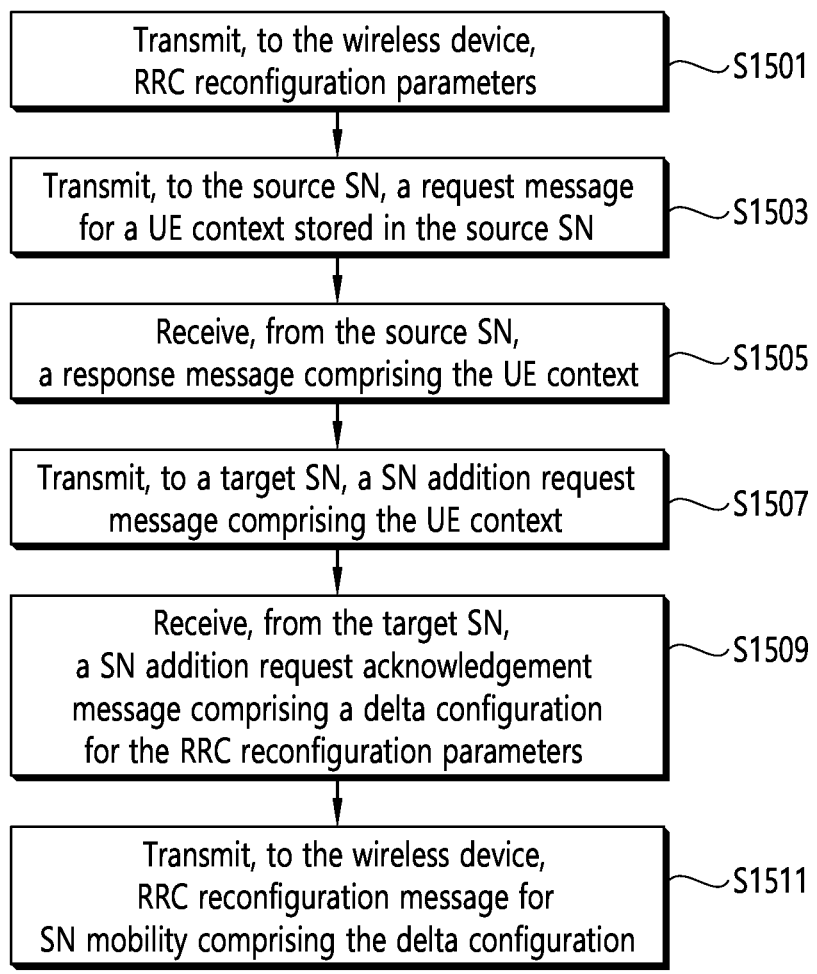
FIG. 15 shows an example of a method for UE context handling for DC by MN according to an embodiment of the present disclosure.

FIG. 15 shows an example of a method for UE context handling for DC by MN according to an embodiment of the present disclosure. Steps illustrated in FIG. 15 may be performed by a MN serving a wireless device with a source SN in DC. The MN may be a kind of a RAN node and/or a base station.

Referring to FIG. 15, in step S1501, the MN may transmit, to the wireless device, RRC reconfiguration parameters.

In step S1503, the MN may transmit, to the source SN, a request message for a UE context stored in the source SN.

In step S1505, the MN may receive, from the source SN, a response message comprising the UE context.

In step S1507, the MN may transmit, to a target SN, a SN addition request message comprising the UE context.

In step S1509, the MN may receive, from the target SN, a SN addition request acknowledgement message comprising a delta configuration for the RRC reconfiguration parameters. The delta configuration may comprise a configuration that is changed with respect to the RRC reconfiguration parameters in the UE context.

In step S1511, the MN may transmit, to the wireless device, RRC reconfiguration message for SN mobility comprising the delta configuration.

The RRC reconfiguration parameters may comprise ReconfigurationWithSync parameters. The ReconfigurationWithSync parameters may comprise at least one of spCellConfigCommon, a radio network temporary identifier (RNTI) value related to an identity of the wireless device, or T304 timer.

The source SN and the target SN may be in an inactive state, and the wireless device may be in a connected state.

The request message may be transmitted and the response message may be received in a SN modification procedure initiated by the MN. The request message may be SN modification request message. The response message may be SN modification request acknowledgement (ACK) message.

The delta configuration may be determined by the target SN based on the UE context comprising the RRC reconfiguration parameters.

The SN addition request ACK message may comprise an indication of a presence of the delta configuration.

The SN mobility may comprise SN change from the source SN to the target SN.

The MN may transmit, to the source SN, an indication to store the UE context.

The RRC reconfiguration parameters may be related to a synchronous reconfiguration to the target SN.

Figure 16:
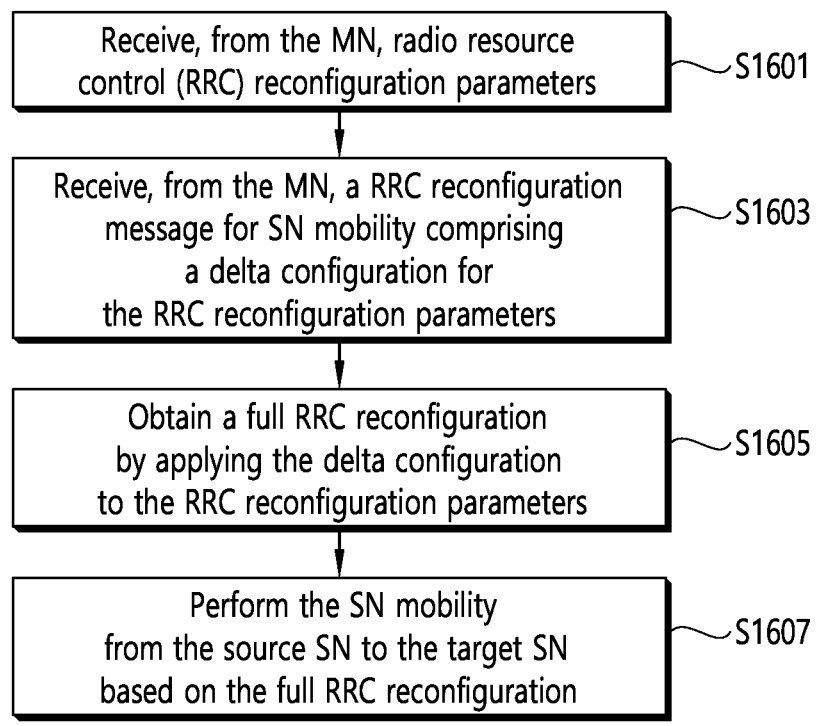
FIG. 16 shows an example of a method for UE context handling for DC by a wireless device according to an embodiment of the present disclosure.

FIG. 16 shows an example of a method for UE context handling for DC by a wireless device according to an embodiment of the present disclosure. Steps illustrated in FIG. 16 may be performed by a wireless device and/or a UE served by the MN and the SN in DC.

Referring to FIG. 16, in step S1601, the wireless device may receive, from the MN, RRC reconfiguration parameters.

In step S1603, the wireless device may receive, from the MN, a RRC reconfiguration message for SN mobility comprising a delta configuration for the RRC reconfiguration parameters.

In step S1605, the wireless device may obtain a full RRC reconfiguration by applying the delta configuration to the RRC reconfiguration parameters.

In step S1607, the wireless device may perform the SN mobility from the source SN to the target SN based on the full RRC reconfiguration.

A ue context comprising the RRC reconfiguration parameters and stored in the source SN may be transferred from the source SN to the target SN via the MN.

The delta configuration may be determined by the target SN based on the UE context comprising the RRC reconfiguration parameters so that the delta configuration comprises a configuration that is changed with respect to the RRC reconfiguration parameters in the UE context.

The delta configuration may be transferred from the target SN to the MN before the wireless device receiving the RRC reconfiguration message comprising the delta configuration.

Figure 17:
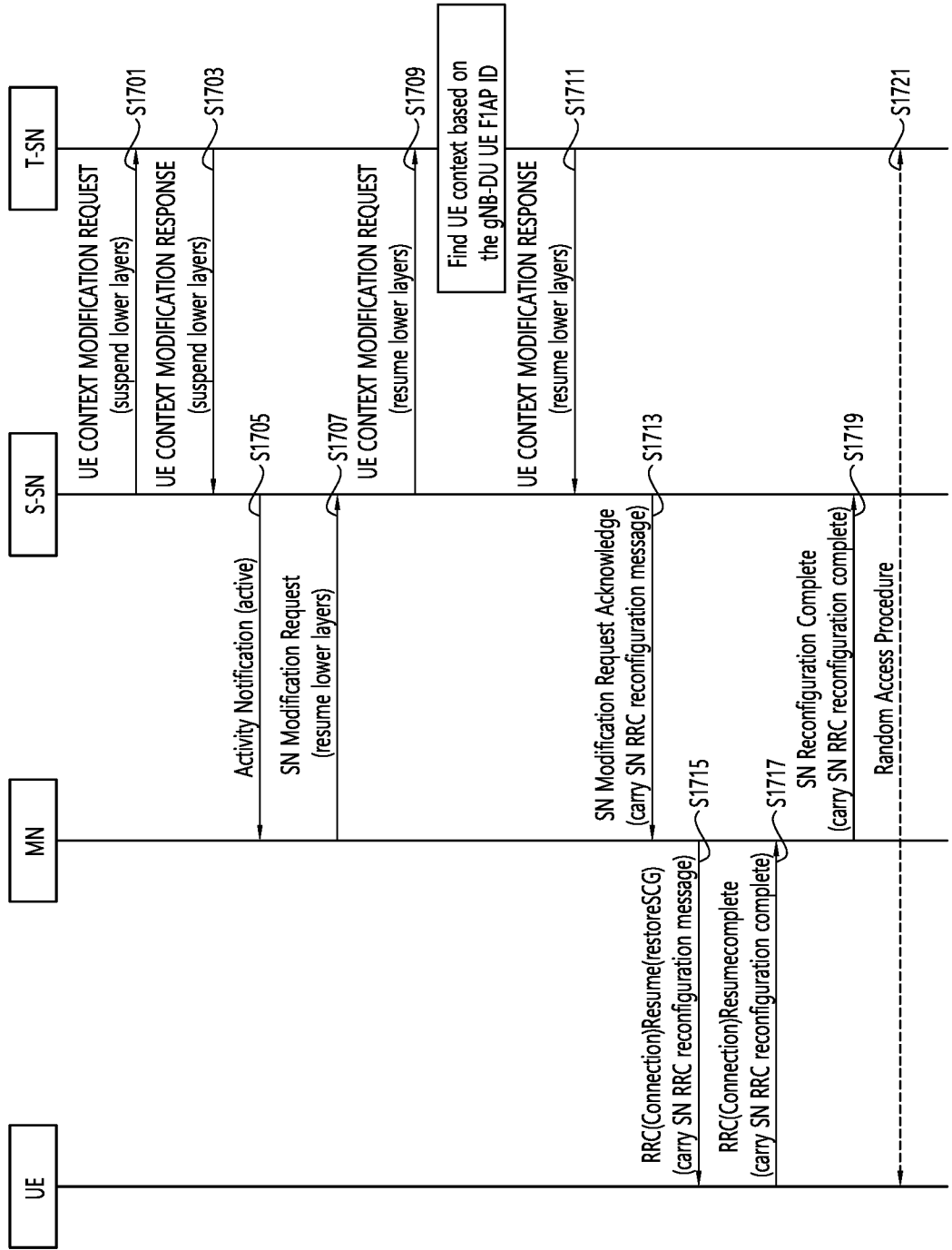
FIG. 17 shows an example of a F1 procedure according to an embodiment of the present disclosure.
Figure 18A:
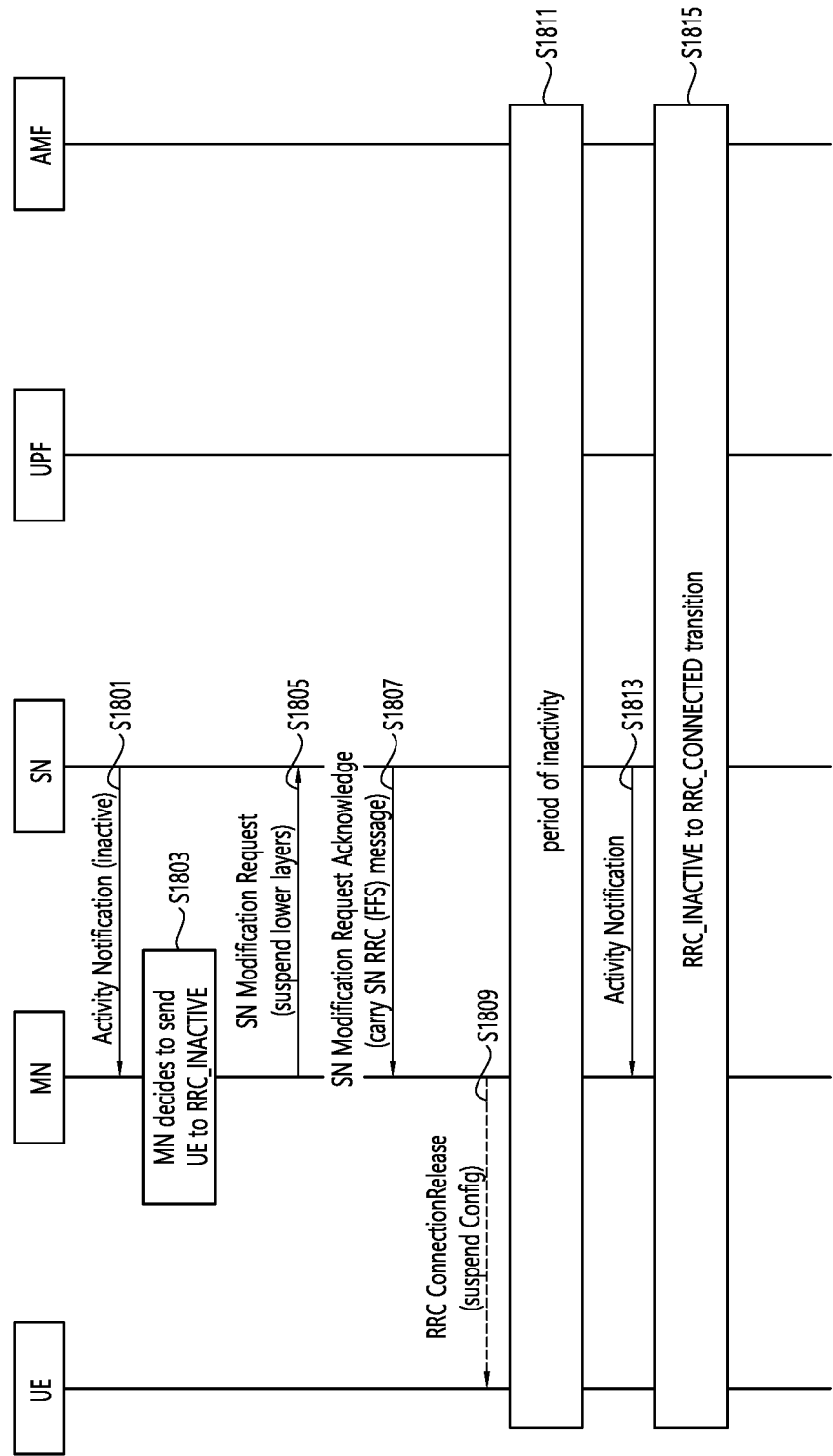
FIGS. 18A and 18B show an example of an activity notification procedure according to an embodiment of the present disclosure.
Figure 18B:
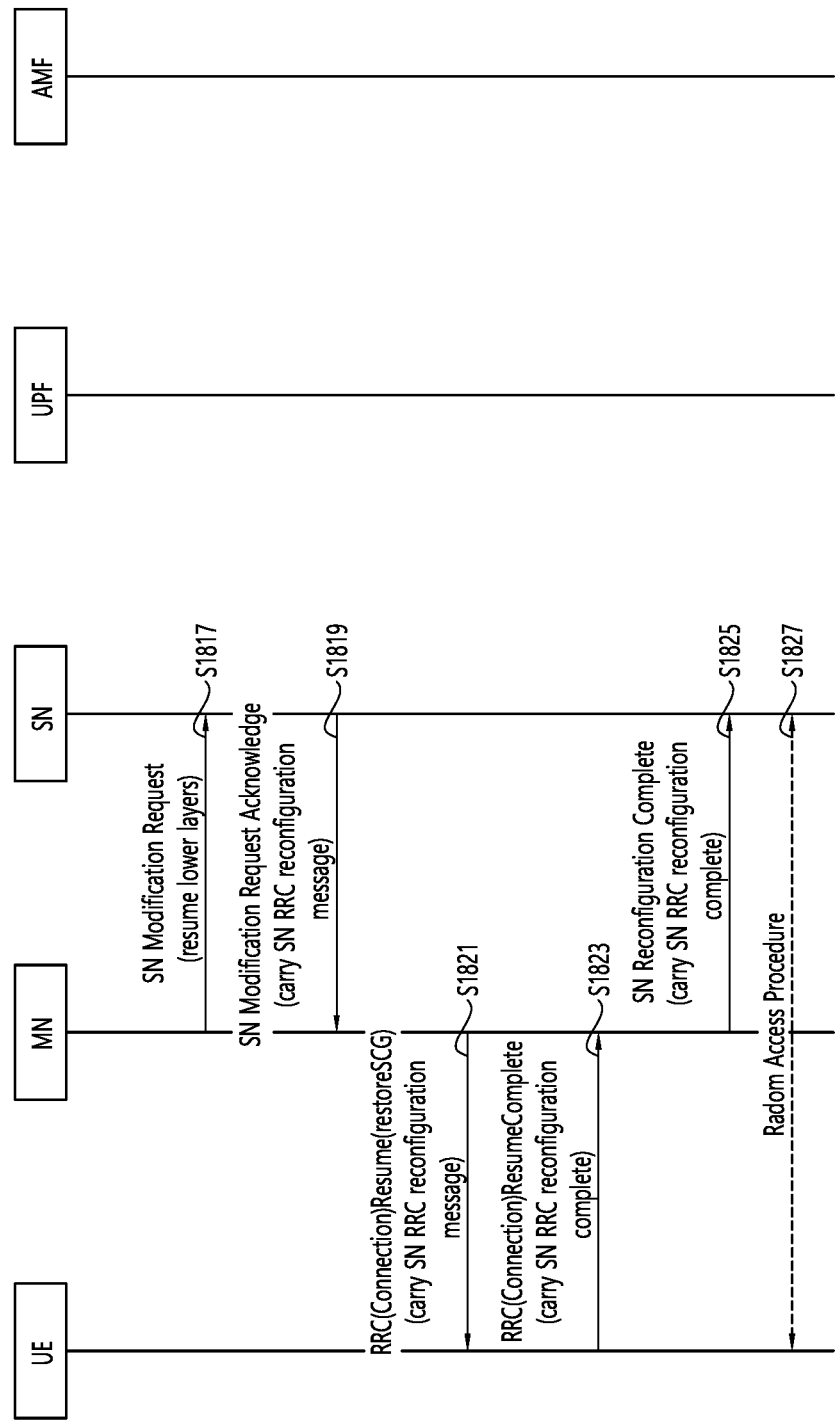
Figure 19A:
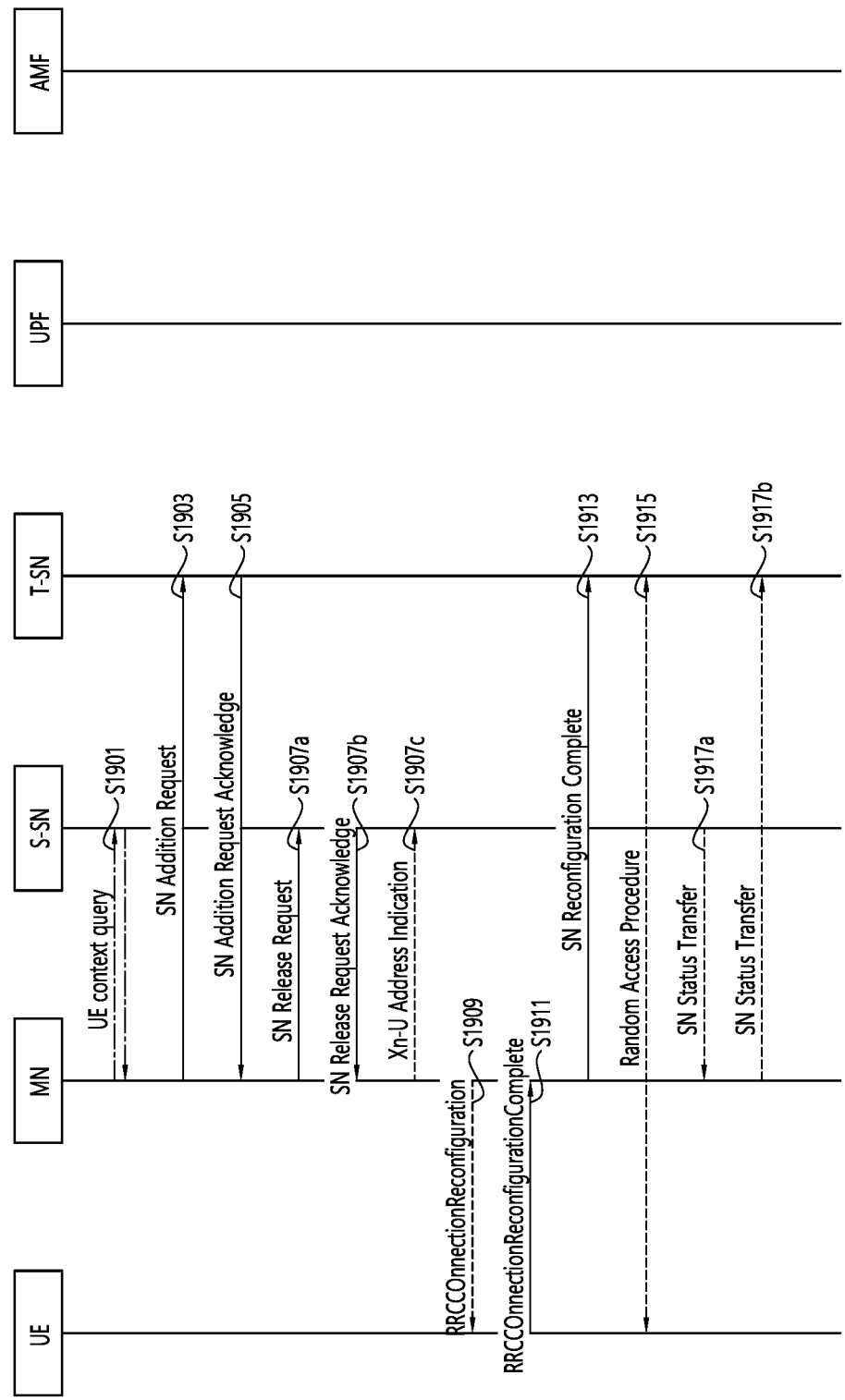
FIGS. 19A and 19B show an example of a diagram for a SN change procedure according to an embodiment of the present disclosure.
Figure 19B:
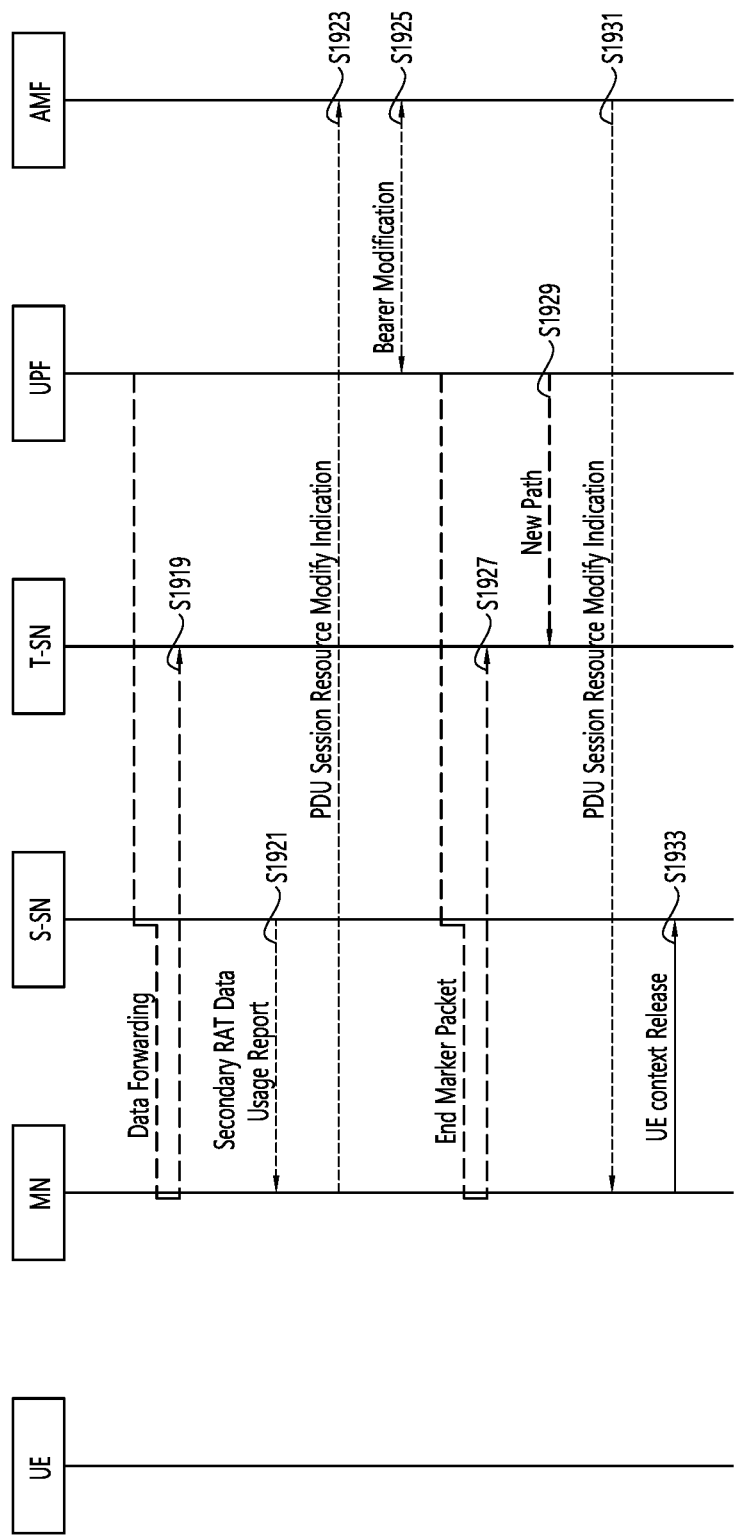

FIG. 17 shows an example of a F1 procedure according to an embodiment of the present disclosure.

Referring to FIG. 17, in step S1701, the CU of SN (i.e., SN-CU) may send the UE CONTEXT MODIFICATION REQUEST message to the DU of SN (i.e., SN-DU) to suspend the SCG of the UE before the UE enters into RRC_INACTIVE state from RRC_CONNECTED state. The SN-CU may also send an indication to SN-DU via the UE CONTEXT MODIFICATION REQUEST message or via another message to let the SN-DU store RRC reconfiguration parameters. The RRC reconfiguration parameters may comprise or be related to ReconfigurationWithSync for a synchronous reconfiguration to a target SpCell. The RRC reconfiguration parameters and/or the ReconfigurationWithSync may comprise at least one of spCellConfigCommon (ServingCellConfigCommon), UE Identity (RNTI-value) or T304 (ENUMERATED {ms50, ms100, ms150, ms200, ms500, ms1000, ms2000, ms10000}). The parameters above may be used for delta configuration on ReconfigurationWithSync when resume happens.

In step S1703, the SN-DU may send the UE CONTEXT MODIFICATION RESPONSE message to the SN-CU, and keep/store all lower layer configurations including the RRC reconfiguration parameters for UEs without transmitting or receiving data to and/or from UE. The RRC reconfiguration parameters may be stored. The RRC reconfiguration parameters may comprise or be related to ReconfigurationWithSync for a synchronous reconfiguration to a target SpCell. The RRC reconfiguration parameters and/or the ReconfigurationWithSync may comprise at least one of spCellConfigCommon (ServingCellConfigCommon), UE Identity (RNTI-value) or T304 (ENUMERATED {ms50, ms100, ms150, ms200, ms500, ms1000, ms2000, ms10000}).

In step S1705, the SN-CN may transmit an activity notification message indicating a user data activity for SN terminated bearers to the MN.

In step S1707, the MN may transmit SN modification request message indicating to resume lower layers to the SN-CU.

In step S1709, the SN-CU may send the UE CONTEXT MODIFICATION REQUEST message to the SN-DU to resume the SCG of the UE before the UE enters into RRC_CONNECTED state from RRC_INACTIVE state.

In step S1711, the SN-DU may send the UE CONTEXT MODIFICATION RESPONSE message to the SN-CU, and use the previously stored lower layer configuration for the UE.

In the above example, the SN-DU may store the RRC reconfiguration parameters including ReconfigurationWithSync upon receiving the UE CONTEXT MODIFICATION REQUEST message in step S1701. However, in another example, the SN-DU may store the RRC reconfiguration parameters including ReconfigurationWithSync upon receiving the UE CONTEXT MODIFICATION REQUEST message in step S1709. The RRC reconfiguration parameters and/or the ReconfigurationWithSync may comprise at least one of

What is claimed is:

1. A method comprising:
    transmitting, by a master node (MN) serving a wireless device with a source secondary node (SN) in a dual connectivity (DC), to the source SN, a request message for context information stored in the source SN;
    receiving, by the MN from the source SN, a response message comprising the context information stored in the source SN,
    wherein the context information stored in the source SN comprises parameters for synchronous reconfiguration comprising a serving cell configuration, an identity of the wireless device and a timer value for synchronous reconfiguration;
    transmitting, by the MN to a target SN, a SN addition request message comprising the parameters for synchronous reconfiguration;
    receiving, by the MN from the target SN, a SN addition request acknowledgement message comprising:
    i) a delta configuration for the parameters for synchronous reconfiguration, wherein the delta configuration comprises a configuration that is changed with respect to the parameters for synchronous reconfiguration; and
    ii) information for a presence of the delta configuration;
    transmitting, by the MN to the wireless device, a reconfiguration message for an SN mobility comprising the delta configuration; and
    receiving, by the MN from the wireless device, a reconfiguration complete message for the SN mobility.

2. The method of claim 1, wherein the parameters for synchronous reconfiguration comprise ReconfigurationWithSync parameters,
    wherein the identity of the wireless device comprises a radio network temporary identifier, RNTI, value, and
    wherein the timer value comprises a T304 timer value.

3. The method of claim 1, wherein the source SN and the target SN are in an inactive state, and the wireless device is in a connected state.

4. The method of claim 1, wherein the request message is transmitted and the response message is received in a SN modification procedure initiated by the MN,
    wherein the request message is SN modification request message, and wherein the response message is SN modification request acknowledgement (ACK) message.

5. The method of claim 1, wherein the delta configuration is determined by the target SN based on the parameters for synchronous reconfiguration.

6. The method of claim 1, wherein the SN mobility comprises an SN change from the source SN to the target SN.

7. The method of claim 1, wherein the wireless device is in communication with at least one of a user equipment, a network, or autonomous vehicles other than the wireless device.

8. A master node (MN) serving a wireless device with a source secondary node (SN) in a dual connectivity (DC), comprising:
 a memory;
 a transceiver; and
 at least one processor operatively coupled to the transceiver and the memory,
 wherein the memory stores instructions that, based on being executed by the at least one processor, perform operations comprising:
 transmitting, to the source SN, a request message for context information stored in the source SN;
 receiving, from the source SN, a response message comprising the context information stored in the source SN,
 wherein the context information stored in the source SN comprises parameters for synchronous reconfiguration comprising a serving cell configuration, an identity of the wireless device and a timer value for synchronous reconfiguration;
 transmitting, to a target SN, a SN addition request message comprising the parameters for synchronous reconfiguration;
 receiving, from the target SN, a SN addition request acknowledgement message comprising:
 i) a delta configuration for the parameters for synchronous reconfiguration, wherein the delta configuration comprises a configuration that is changed with respect to the parameters for synchronous reconfiguration; and
 ii) information for a presence of the delta configuration; and
 transmitting, to the wireless device, a reconfiguration message for an SN mobility comprising the delta configuration.

9. The MN of claim 8, wherein the parameters for synchronous reconfiguration comprise ReconfigurationWithSync parameters,
 wherein the identity of the wireless device comprises a radio network temporary identifier, RNTI, value, and
 wherein the timer value comprises a T304 timer value.

10. The MN of claim 8, wherein the source SN and the target SN are in an inactive state, and the wireless device is in a connected state.

11. A method comprising:
 receiving, by a wireless device from a master node (MN) serving the wireless device with a source secondary node (SN) in a dual connectivity (DC), a reconfiguration message for an SN mobility,
 wherein the reconfiguration message comprises a delta configuration on parameters for synchronous reconfiguration, and the delta configuration comprises a configuration that is changed with respect to parameters for synchronous reconfiguration; and
 transmitting, by the wireless device to the MN, a reconfiguration complete message for the SN mobility,
 wherein context information stored in the source SN is transferred from the source SN to the MN via a response message, in response to a request message for the context information stored in the source SN transmitted from the MN to the source SN,
 wherein the context information stored in the source SN comprises the parameters for synchronous reconfiguration comprising a serving cell configuration, an identity of the wireless device and a timer value for synchronous reconfiguration,
 wherein a SN addition request message comprising the parameters for synchronous reconfiguration is transmitted from the MN to a target SN, and
 wherein a SN addition request acknowledgement message is transmitted from the target SN to the MN, the SN addition request acknowledgement message comprising:
 i) the delta configuration for the parameters for synchronous reconfiguration; and
 ii) information for a presence of the delta configuration.

* * * * *